(12) United States Patent
Rosenberg

(10) Patent No.: US 7,562,117 B2
(45) Date of Patent: Jul. 14, 2009

(54) SYSTEM, METHOD AND COMPUTER PROGRAM PRODUCT FOR COLLABORATIVE BROADCAST MEDIA

(75) Inventor: Louis B. Rosenberg, Arroyo Grande, CA (US)

(73) Assignee: Outland Research, LLC, Pismo Beach, CA (US)

( * ) Notice: Subject to any disclaimer, the term of this patent is extended or adjusted under 35 U.S.C. 154(b) by 528 days.

(21) Appl. No.: 11/533,037

(22) Filed: Sep. 19, 2006

(65) Prior Publication Data

US 2006/0288074 A1    Dec. 21, 2006

Related U.S. Application Data

(63) Continuation-in-part of application No. 11/285,534, filed on Nov. 22, 2005, now Pat. No. 7,489,979, and a continuation-in-part of application No. 11/223,368, filed on Sep. 9, 2005.

(60) Provisional application No. 60/720,071, filed on Sep. 23, 2005.

(51) Int. Cl.
*G06F 15/173* (2006.01)
*G06F 15/16* (2006.01)

(52) U.S. Cl. .................... 709/205; 709/206; 709/232; 709/246; 709/219; 709/231; 705/40; 705/59

(58) Field of Classification Search ......... 709/204–206, 709/219, 231, 246
See application file for complete search history.

(56) References Cited

U.S. PATENT DOCUMENTS

| 4,018,121 A | 4/1977 | Chowning |
| 4,054,749 A | 10/1977 | Suzuki |

(Continued)

FOREIGN PATENT DOCUMENTS

DE    19650900    6/1998

OTHER PUBLICATIONS

Non Final Office Action from U.S. Appl. No. 11/610,494 mailed Jan. 26, 2009.

(Continued)

*Primary Examiner*—Jude J Jean Gilles
(74) *Attorney, Agent, or Firm*—Thomas F. Lebens; Sinsheimer Juhnke Lebens & McIvor, LLP

(57) ABSTRACT

A system, method and computer program product for collaborative media selection among a media provider and a collaborative group of media players, where each individual media player is in processing communications with the media provider. Enables a media broadcaster to perform a procedure which involves (a) sending one or more media suggestions to a plurality of media playing devices that are being used by a plurality of participating users, (b) receiving from each of the plurality of participating users via their media playing devices a response indicating acceptances or rejection for the suggested media item, (c) tallying the responses and determining if the media suggestion is collaboratively accepted by the group of collaborating users, and (d) broadcasting media content for real-time play to the plurality of media playing devices if the media suggestion is collaboratively accepted. Otherwise, sending an alternative suggested media item. The present invention further includes a variety of prioritization methods wherein participating users may have non-equally impact upon in the collaborative decision making process.

32 Claims, 6 Drawing Sheets

U.S. PATENT DOCUMENTS

| | | |
|---|---|---|
| 4,091,302 A | 5/1978 | Yamashita |
| 4,360,345 A | 11/1982 | Hon |
| 4,430,595 A | 2/1984 | Nakasone |
| 4,490,810 A | 12/1984 | Hon |
| 4,712,101 A | 12/1987 | Culver |
| 4,823,634 A | 4/1989 | Culver |
| 4,868,549 A | 9/1989 | Affinito |
| 4,907,973 A | 3/1990 | Hon |
| 4,983,901 A | 1/1991 | Lehmer |
| 5,164,530 A | 11/1992 | Iwase |
| 5,185,561 A | 2/1993 | Good |
| 5,186,629 A | 2/1993 | Rohen |
| 5,189,355 A | 2/1993 | Larkins |
| 5,220,260 A | 6/1993 | Schuler |
| 5,273,038 A | 12/1993 | Beavin |
| 5,296,846 A | 3/1994 | Ledley |
| 5,296,871 A | 3/1994 | Paley |
| 5,534,917 A | 7/1996 | MacDougall |
| 5,559,412 A | 9/1996 | Schuler |
| 5,572,201 A | 11/1996 | Graham et al. |
| 5,614,687 A | 3/1997 | Yamada et al. |
| 5,629,594 A | 5/1997 | Jacobus |
| 5,634,051 A | 5/1997 | Thomson |
| 5,643,087 A | 7/1997 | Marcus |
| 5,666,138 A | 9/1997 | Culver |
| 5,701,140 A | 12/1997 | Rosenberg |
| 5,704,791 A | 1/1998 | Gillio |
| 5,709,219 A | 1/1998 | Chen |
| 5,721,566 A | 2/1998 | Rosenberg |
| 5,724,264 A | 3/1998 | Rosenberg |
| 5,728,960 A | 3/1998 | Sitrick |
| 5,731,804 A | 3/1998 | Rosenberg |
| 5,742,278 A | 4/1998 | Chen |
| 5,747,714 A | 5/1998 | Kniest et al. |
| 5,754,023 A | 5/1998 | Roston |
| 5,755,577 A | 5/1998 | Gillio |
| 5,767,839 A | 6/1998 | Rosenberg |
| 5,769,640 A | 6/1998 | Jacobus |
| 5,791,908 A | 8/1998 | Gillio |
| 5,800,177 A | 9/1998 | Gillio |
| 5,800,178 A | 9/1998 | Gillio |
| 5,821,920 A | 10/1998 | Rosenberg |
| 5,825,308 A | 10/1998 | Rosenberg |
| 5,828,197 A | 10/1998 | Martin |
| 5,857,939 A | 1/1999 | Kaufman |
| 5,870,740 A | 2/1999 | Rose et al. |
| 5,882,206 A | 3/1999 | Gillio |
| 5,889,670 A | 3/1999 | Schuler |
| 5,889,672 A | 3/1999 | Schuler |
| 5,897,437 A | 4/1999 | Nishiumi |
| 5,916,063 A | 6/1999 | Alessandri |
| 5,928,248 A | 7/1999 | Acker |
| 5,952,596 A | 9/1999 | Kondo |
| 6,024,576 A | 2/2000 | Moore |
| 6,088,017 A | 7/2000 | Tremblay |
| 6,096,004 A | 8/2000 | Megland |
| 6,106,301 A | 8/2000 | Merril |
| 6,111,577 A | 8/2000 | Ziles |
| 6,119,114 A | 9/2000 | Smadja |
| 6,154,201 A | 11/2000 | Levin et al. |
| 6,160,489 A | 12/2000 | Perry |
| 6,192,340 B1 | 2/2001 | Abecassis |
| 6,199,067 B1 | 3/2001 | Geller |
| 6,211,861 B1 | 4/2001 | Rosenberg et al. |
| 6,244,742 B1 | 6/2001 | Yamada |
| 6,256,011 B1 | 7/2001 | Culver |
| 6,298,323 B1 | 10/2001 | Kaemmerer |
| 6,300,938 B1 | 10/2001 | Culver |
| 6,304,520 B1 | 10/2001 | Watanabe |
| 6,314,094 B1 | 11/2001 | Boys et al. |
| 6,323,412 B1 | 11/2001 | Loo |
| 6,366,272 B1 | 4/2002 | Rosenberg |
| 6,376,971 B1 | 4/2002 | Pelrine |
| 6,401,027 B1 | 6/2002 | Xu et al. |
| 6,411,896 B1 | 6/2002 | Shuman et al. |
| 6,429,846 B2 | 8/2002 | Rosenberg |
| 6,470,207 B1 | 10/2002 | Simon |
| 6,470,302 B1 | 10/2002 | Cunningham |
| 6,498,982 B2 | 12/2002 | Bellesfield et al. |
| 6,504,571 B1 | 1/2003 | Narayanaswami et al. |
| 6,526,411 B1 | 2/2003 | Ward |
| 6,563,487 B2 | 5/2003 | Martin |
| 6,564,210 B1 | 5/2003 | Korda et al. |
| 6,598,707 B2 | 7/2003 | Nakagaki et al. |
| 6,636,835 B2 | 10/2003 | Ragsdale-Elliott et al. |
| 6,640,187 B1 | 10/2003 | Chenault |
| 6,655,817 B2 | 12/2003 | Devlin |
| 6,665,644 B1 | 12/2003 | Kanevsky et al. |
| 6,686,531 B1 | 2/2004 | Pennock et al. |
| 6,686,911 B1 | 2/2004 | Levin |
| 6,697,044 B2 | 2/2004 | Shahoian |
| 6,721,706 B1 | 4/2004 | Strubbe et al. |
| 6,732,090 B2 | 5/2004 | Shanahan et al. |
| 6,735,568 B1 | 5/2004 | Buckwalter et al. |
| 6,749,537 B1 | 6/2004 | Hickman |
| 6,765,495 B1 | 7/2004 | Dunning et al. |
| 6,768,066 B2 | 7/2004 | Wehrenberg |
| 6,768,246 B2 | 7/2004 | Pelrine |
| 6,772,026 B2 | 8/2004 | Bradbury et al. |
| 6,801,837 B2 | 10/2004 | Carlstedt et al. |
| 6,804,643 B1 | 10/2004 | Kiss |
| 6,808,472 B1 | 10/2004 | Hickman |
| 6,812,394 B2 | 11/2004 | Weissflog |
| 6,812,624 B1 | 11/2004 | Pei |
| 6,822,635 B2 | 11/2004 | Shahoian |
| 6,829,599 B2 | 12/2004 | Chidlovskii |
| 6,858,970 B2 | 2/2005 | Malkin |
| 6,863,220 B2 | 3/2005 | Selker |
| 6,871,142 B2 | 3/2005 | Kumada et al. |
| 6,882,086 B2 | 4/2005 | Kornbluh |
| 6,885,362 B2 | 4/2005 | Suomela |
| 6,906,643 B2 | 6/2005 | Samadani |
| 6,915,295 B2 | 7/2005 | Okamoto et al. |
| 6,921,351 B1 | 7/2005 | Hickman |
| 6,929,481 B1 | 8/2005 | Alexander |
| 6,941,324 B2 | 9/2005 | Plastina et al. |
| 6,956,538 B2 | 10/2005 | Moore |
| 6,970,088 B2 | 11/2005 | Kovach |
| 6,982,697 B2 | 1/2006 | Wilson |
| 6,983,139 B2 | 1/2006 | Dowling et al. |
| 6,985,143 B2 | 1/2006 | Pharr |
| 6,986,320 B2 | 1/2006 | Shelton |
| 6,987,221 B2 | 1/2006 | Platt |
| 7,023,423 B2 | 4/2006 | Rosenberg |
| 7,100,835 B2 | 9/2006 | Selker |
| 7,181,438 B1 | 2/2007 | Szabo |
| 7,207,935 B1 | 4/2007 | Lipo |
| 7,227,071 B2 | 6/2007 | Tagawa et al. |
| 7,249,126 B1 | 7/2007 | Ginsburg et al. |
| 7,283,997 B1 | 10/2007 | Howard et al. |
| 7,489,979 B2 | 2/2009 | Rosenberg |
| 2001/0003542 A1 | 6/2001 | Kita |
| 2002/0016786 A1 | 2/2002 | Pitkow et al. |
| 2002/0054060 A1 | 5/2002 | Schena |
| 2002/0078045 A1 | 6/2002 | Dutta |
| 2002/0091796 A1 | 7/2002 | Higginson |
| 2002/0116476 A1 | 8/2002 | Eyal et al. |
| 2002/0133418 A1 | 9/2002 | Hammond et al. |
| 2002/0142701 A1 | 10/2002 | Rosenberg |
| 2002/0186221 A1 | 12/2002 | Bell |
| 2003/0011467 A1 | 1/2003 | Suomela |
| 2003/0033287 A1 | 2/2003 | Shanahan et al. |
| 2003/0047683 A1 | 3/2003 | Kaushal |
| 2003/0069077 A1 | 4/2003 | Korienek |

| | | |
|---|---|---|
| 2003/0074130 A1 | 4/2003 | Negishi et al. |
| 2003/0110038 A1 | 6/2003 | Sharma |
| 2003/0115193 A1 | 6/2003 | Okamoto et al. |
| 2003/0187837 A1 | 10/2003 | Cutliss |
| 2003/0193572 A1 | 10/2003 | Wilson |
| 2003/0195884 A1 | 10/2003 | Boyd et al. |
| 2003/0217007 A1 | 11/2003 | Fukushima |
| 2003/0220917 A1 | 11/2003 | Copperman et al. |
| 2003/0236582 A1 | 12/2003 | Zamir et al. |
| 2004/0015714 A1 | 1/2004 | Abraham et al. |
| 2004/0017482 A1 | 1/2004 | Weitman |
| 2004/0019588 A1 | 1/2004 | Doganata et al. |
| 2004/0068486 A1 | 4/2004 | Chidlovskii |
| 2004/0097806 A1 | 5/2004 | Hunter |
| 2004/0103087 A1 | 5/2004 | Mukherjee et al. |
| 2004/0117306 A1* | 6/2004 | Karaoguz et al. ............. 705/40 |
| 2004/0124248 A1 | 7/2004 | Selker |
| 2004/0164971 A1 | 8/2004 | Hayward |
| 2004/0166937 A1 | 8/2004 | Rothschild |
| 2004/0186824 A1 | 9/2004 | Delic et al. |
| 2004/0224638 A1 | 11/2004 | Fadell et al. |
| 2004/0225519 A1 | 11/2004 | Martin |
| 2005/0021470 A1 | 1/2005 | Martin et al. |
| 2005/0039206 A1 | 2/2005 | Opdycke |
| 2005/0071328 A1 | 3/2005 | Lawrence et al. |
| 2005/0080786 A1 | 4/2005 | Fish |
| 2005/0088318 A1 | 4/2005 | Liu et al. |
| 2005/0096047 A1 | 5/2005 | Haberman et al. |
| 2005/0107218 A1 | 5/2005 | Chuang et al. |
| 2005/0107688 A1 | 5/2005 | Strommer |
| 2005/0126370 A1 | 6/2005 | Takai |
| 2005/0129253 A1 | 6/2005 | Chen |
| 2005/0139660 A1 | 6/2005 | Maxymych et al. |
| 2005/0149213 A1 | 7/2005 | Guzak et al. |
| 2005/0149499 A1 | 7/2005 | Franz et al. |
| 2005/0154636 A1 | 7/2005 | Hildinger et al. |
| 2005/0174975 A1 | 8/2005 | Mgrdechian et al. |
| 2005/0212749 A1 | 9/2005 | Marvit et al. |
| 2005/0222981 A1 | 10/2005 | Lawrence et al. |
| 2005/0222989 A1 | 10/2005 | Haveliwala et al. |
| 2005/0251576 A1 | 11/2005 | Weel |
| 2005/0278317 A1 | 12/2005 | Gross et al. |
| 2005/0286546 A1 | 12/2005 | Basseli et al. |
| 2006/0017692 A1 | 1/2006 | Wehrenberg et al. |
| 2006/0022955 A1 | 2/2006 | Kennedy |
| 2006/0026521 A1 | 2/2006 | Hotelling et al. |
| 2006/0060068 A1 | 3/2006 | Hwang |
| 2006/0095412 A1 | 5/2006 | Zito et al. |
| 2006/0107822 A1 | 5/2006 | Bowen |
| 2006/0111621 A1 | 5/2006 | Coppi et al. |
| 2006/0161621 A1 | 7/2006 | Rosenberg |
| 2006/0167576 A1 | 7/2006 | Rosenberg |
| 2006/0167943 A1 | 7/2006 | Rosenberg |
| 2006/0169125 A1 | 8/2006 | Ashkenazi |
| 2006/0173828 A1 | 8/2006 | Rosenberg |
| 2006/0173837 A1 | 8/2006 | Berstis et al. |
| 2006/0188109 A1 | 8/2006 | Makino et al. |
| 2006/0189386 A1 | 8/2006 | Rosenberg |
| 2006/0195361 A1 | 8/2006 | Rosenberg |
| 2006/0243120 A1 | 11/2006 | Takai |
| 2006/0253210 A1 | 11/2006 | Rosenberg |
| 2006/0276919 A1 | 12/2006 | Shirai |
| 2007/0044641 A1 | 3/2007 | McKinney et al. |
| 2007/0067294 A1 | 3/2007 | Ward et al. |
| 2007/0074618 A1 | 4/2007 | Vergo |
| 2007/0113725 A1 | 5/2007 | Oliver |
| 2007/0125852 A1 | 6/2007 | Rosenberg |
| 2007/0135264 A1 | 6/2007 | Rosenberg |
| 2007/0156676 A1 | 7/2007 | Rosenberg |
| 2007/0156677 A1 | 7/2007 | Szabo |
| 2007/0271228 A1 | 11/2007 | Querel |
| 2008/0005075 A1 | 1/2008 | Horvitz et al. |
| 2008/0016040 A1 | 1/2008 | Jones et al. |
| 2008/0016218 A1 | 1/2008 | Jones et al. |

OTHER PUBLICATIONS

Notice of Allowance from U.S. Appl. No. 11/267,079 mailed Feb. 24, 2009.
Examiner Interview Summary from 11/267,079 mailed Feb. 24, 2009.
PCT/US2006/004373, US, A1, filed Aug. 17, 2006, Rosenberg.
Yahoo media player downloaded from www.yahoo.com on Sep. 19, 2006. Not admitted as prior art.
U.S.P.T.O, Notice of Allowance for U.S. Appl. No. 11/285,534 mailed Nov. 19, 2008.
U.S.P.T.O, Examiner Interview for U.S. Appl. No. 11/285,534 mailed Nov. 19, 2008.
U.S.P.T.O, Non Final Office Action from U.S. Appl. No. 11/223,368 mailed Dec. 24, 2008.
Sullivan, Danny, "Eurekster Launches Personalized Social Search", SearchEngineWatch.com *Online Newsletter* Jan. 24, 2004.
U.S.P.T.O., Office Action from U.S. Appl. No. 11/298,797 mailed Jun. 25, 2008.
U.S.P.T.O., Office Action from U.S. Appl. No. 11/285,534 mailed Jul. 21, 2008.
U.S.P.T.O., Office Action from U.S. Appl. No. 11/267,079 mailed Jul. 17, 2008.
"YMCA", downloaded from www.ymcamidpen.org/textpage.php?b=2&p=fitlinxx on Jul. 10, 2007, (2003).
Demartini, Marilyn "Cyber Fitness", downloaded from www.physicalmag.com/articlesTemp.as?dept=14&articleID=1812 on Jul. 10, 2007, (Feb. 18, 2001).
Munro, Aria "eNewsChannels", downloaded from enewschannels.com/20070106enc582-025321.php on Aug. 5, 2007, (Jul. 1, 2007).
Oliver, Nuria et al., "Enhancing Exercise Performance through Real-time Phsiological Monitoring and Music: A User Study", *Proceedings of Pervasive Health 2006*. Innsbruck, Austria. Nov. 2006, et all =Lucas Kreger-Stckles,(Nov. 2006).
Betlyon, Jim "Omni Fitness Equipment Stores Integrate Physical Genius Online Fitness Tools", downloaded from www.physicalgenius.com on Aug. 5, 2007, (Apr. 19, 2000).
"Tune Your Run", *Apple Computer/Nike*, downloaded from www.apple.com on Jun. 28, 2006.
Nintendo, "Kirby's Tilt N' Tumble", downloaded from www.nintendo.com; Nov. 14, 2006; 2 pages.
Cook, Perry et al., "Using DSP-Based Parametric Physical Syntheses Models to Study Human Sound Perception", *2003 IEEE Workshop on Applications of Signal Processing to Audio and Acoustics*, (2003).
McKinney and Moelants, "Extracting the Perceptual Tempo from Music", *published at the ISMIR 2004 5th International Conference on Music Information Retrieval*, (2004).
"PCDJ Red Virtual Rack Module", *by Visiosonic of Clearwater, FL*. Downloaded from www.visiosonic.com on Jun. 27, 2006.
"Beat rates per minute", downloaded from www.bpmlist.com on Jun. 27, 2006. *Lulu Publishing*. ISBN 1-4116-4211-2.
Metzger, Christian et al., "FreeDigiter: A Contact-free Device for Gesture Control", *IEEE 8th International Symposium on Wearable Computers*, (Nov. 4, 2004).
"Jukebox Without Quarters", *Business Opportunities Weblog*, http://www.business-opportunities.bix/2007/03/30/jukebox-without-quarters/, cited Mar. 30, 2007, printed May 22, 2007,2 pages.
Rosenberg, "U.S. Appl. No. 11/551,702", filed Oct. 20, 2006.
Office Action from U.S. Appl. No. 11/298,797 dated Jan. 9, 2008.
Rosenberg, Louis "Vitural Fixtures: perceptual Overlays Enchance Operator Performance in Telepresence Tasks", *Ph.D. Dissertation, Standford University*, (Jun. 1994).
Rosenberg, Louis "A force Feedback Programming Primer", *Immersion Corporation*, (1997).
"www.confluence.org", first visited May 2005.
"Dialogr", http://www.dialogr.com/PostThought.cfm?/TopicId=684, first printed May 22, 2007.
Rosenberg, "U.S. Appl. No. 11/772,808", filed Jul. 2, 2007.
Rosenberg, "U.S. Appl. No. 11/223,368", filed Sep. 9, 2005.

Oguro, K et al., "Polymer Electrolyte Actuator with Gold Electrodes", *SPIE Conference on Electroactive Polymer Actuators and Devices, SPEE* vol. 3669, 1999.
Lumia, R et al., "Microgripper design using electro-active polymers", *SPIE Conference on Electroactive Polymer Actuators and Devices, SPEE* vol. 3669, 1999, (Mar. 1999).
Rosenberg, "U.S. Appl. No. 11/298,434", filed Aug. 24, 2006.
Rosenberg, "U.S. Appl. No. 11/427,320", filed Jun. 28, 2006.
McKinney and Moelants, et al., "Deviations from the Resonance Theory of Temp Induction", *published at the Conference on Interdisciplinary Musicology*, et al=Dirk Moelands,(2004).
Rosenberg, "U.S. Appl. No. 11/626,355", filed Jan. 23, 2007.
Rosenberg, "U.S. Appl. No. 11/561,981", filed Nov. 21, 2006.
Rosenberg, "U.S. Appl. No. 11/535,417", filed Sep. 26, 2006.
Murray, et al., "Underwater Teleroboticsa and Virtual Reality: A New Partnership", *NCCOSC RDT&E Division*; Jun. 20, 1996; pp. 1-10; San Diego, CA, 1-10.
Rosenberg, "U.S. Appl. No. 11/223,368", filed Sep. 9, 2005.
Rosenberg, "U.S. Appl. No. 11/610,615", filed Dec. 14, 2006.
Rosenberg, "U.S. Appl. No. 11/267,079", filed Nov. 3, 2005.
Rosenberg, "U.S. Appl. No. 11/285,534", filed Nov. 22, 2005.
Rosenberg, "U.S. Appl. No. 11/533,037", filed Sep. 19, 2006.
Rosenberg, "U.S. Appl. No. 11/749,134", filed May 15, 2007.
Rosenberg, "U.S. Appl. No. 11/427,325", filed Jun. 28, 2006.
Rosenberg, "U.S. Appl. No. 11/610,499", filed Dec. 13, 2006.
Rosenberg, "U.S. Appl. No. 11/315,755", filed Dec. 21, 2005.
Rosenberg, "U.S. Appl. No. 11/344,612", filed Nov. 16, 2006.
Rosenberg, "U.S. Appl. No. 11/344,701", filed Jan. 31, 2006.
Rosenberg, "U.S. Appl. No. 11/425,990", filed Jun. 22, 2006.
Spohrer, "Information in Places", *IBM Systems Journal*; 1999; pp. 602-628; vol. 38, No. 4, 602-628.
Rosenberg, "U.S. Appl. No. 11/619,607", filed Jan. 3, 2007.
Rosenberg, "U.S. Appl. No. 11/341,948", filed Jan. 27, 2006.
Rosenberg, "U.S. Appl. No. 11/683,394", filed Mar. 7, 2007.
Rosenberg, "U.S. Appl. No. 11/344,613", filed Jan. 31, 2006.
Rosenberg, "U.S. Appl. No. 11/682,874", filed Mar. 6, 2007.
Rosenberg, " U.S. Appl. No. 11/539,598", filed Oct. 6, 2006.
Rosenberg, "U.S. Appl. No. 11/285,534", filed Nov. 22, 2005.
Shahinpoor, Mohsen "Electro-mechanics of ionoelastic beams as electrically-controllable artificial muscles", *SPIE Conference on Electroactive Polymer Actuators and Devices, SPEE* vol. 3669, 1999.
Rosenberg, "U.S. Appl. No. 11/278,531", filed Apr. 3, 2006.
Rosenberg, "U.S. Appl. No. 11/697,704", filed Apr. 6, 2007.
Sharper Image, "Laser Baseball", Item # PS115; downloaded from www.sharperimage.com on Dec. 9, 2005, 18 pages.
Rosenberg, "U.S. Appl. No. 11/610,615", filed May 10, 2007.
Rosenberg, "U.S. Appl. No. 11/677,045", filed Feb. 20, 2007.
Rosenberg, "U.S. Appl. No. 11/619,605", filed Jan. 3, 2007.
Rosenberg, "U.S. Appl. No. 11/610,494", filed Dec. 13, 2006.
Rosenberg, "U.S. Appl. No. 11/562,036", filed Nov. 21, 2006.
Rosenberg, "U.S. Appl. No. 11/282,379", filed Aug. 17, 2006.
Rosenberg, "U.S. Appl. No. 11/298,797", filed Aug. 3, 2006.
Rosenberg, "U.S. Appl. No. 11/341,021", filed Aug. 3, 2006.
Rosenberg, "U.S. Appl. No. 11/383,197", filed Aug. 31, 2006.
Reinhold, Ross "Applications of Myers-Briggs Type Indicator, Personality Type", available at http://www.personalitypathways.com/ last visited Jun. 15, 2007.
"Human Metrics: Jung Typology test", available at http://www.humanmetrics.com/cgi-win/JTypes2.asp last visited Jun. 15, 2007.
Rosenberg, "U.S. Appl. No. 11/246,050", filed Feb. 8, 2007.
Rosenberg, "U.S. Appl. No. 11/260,000", filed Oct. 26, 2005.
Rosenberg, "U.S. Appl. No. 11/299,096", filed Dec. 9, 2005.
Rosenberg, "U.S. Appl. No. 11/315,762", filed Dec. 21, 2005.
Rosenberg, "U.S. Appl. No. 11/341,025", filed Jan. 27, 2006.
Rosenberg, "U.S. Appl. No. 11/383,195", filed Aug. 10, 2006.
Rosenberg, "U.S. Appl. No. 11/422,065", filed Aug. 24, 2006.
Rosenberg, "U.S. Appl. No. 11/425,981", filed Jun. 22, 2007.
Rosenberg, "U.S. Appl. No. 11/428,341", filed Oct. 21, 2006.
Wu and Childers, "Gender Recognition from Speech Part I: Coarse Analysis", (1991).
Wu and Childers, "Gender Recognition from Speech Part II: Fine Analysis", (1991).
Brin and Page, "The Anatomy of a Large-Scale Hypertextual Search Engine", *Standford University*, 1998.
Hayashi, J et al., "A Method for Estimating and Modeling Age and Gender Using Facial Image Processing", (2001).
Schotz, "Automatic prediction of speaker age using CART", (2003).
Castrillon, et al., "Identity and Gender Recognition Using the ENCARA Real-Time Face Detector", *CAEPIA*, (Nov. 2003).
"www.wwmx.org", First visited in May 2005.
Office Action from U.S. Appl. No. 11/282,379 dated Sep. 18, 2007.
Kornbluh, et al., "High-field Electrostriction of Elastomeric Polymer Dielectrics for Actuation", *SPIE Conference on Electroactive Polymer Actuators and Devices*, (Mar. 1999).
Kawahara, et al., "Designing a Universal Remote Control for the Ubiquitous Computing Environment", *EE Times*, 2003.
Abrial, et al., "A New Contactless Smartcard IC Using an On-Chip Antenna and an Asynchronous Micro-controller", (2001).
Rosenberg, "U.S. Appl. No. 11/341,100", filed Jan. 27, 2006.
Rosenberg, "U.S. Appl. No. 11/278,120", filed Oct. 5, 2006.
Morhring, et al., "Video See-Through AR on Consumer Cell-Phones", (Mar. 2004).
Gordon, et al., "Silicon Optical Navigation", (2003).
"Remotely Operated Vehicles Seaeye Falcon", www.roperresources.com, (May 2002).
"Remotely Operated Vehicle", www.seabotix.com/products/lbv150.htm, (Dec. 2001).
"Unmanned Aircraft Systems", www.baiaerosystems.com, (1985).
"www.gesturetek.com", (Jul. 1996).
"www.reactrix.com", (2002).
Office Action from U.S. Appl. No. 11/422,065, dated Mar. 28, 2007.
Office Action from U.S. Appl. No. 11/422,065 dated Aug. 31, 2007.
Rosenberg, "U.S. Appl. No. 11/749,134", filed May 15, 2007.
Rosenberg, "U.S. Appl. No. 11/749,137", filed May 15, 2007.
Rosenberg, "U.S. Appl. No. 11/762,017", filed Oct. 4, 2007.
Rosenberg, "U.S. Appl. No. 11/772,803", filed Jul. 12, 2007.
Rosenberg, "U.S. Appl. No. 11/846,530", filed Aug. 29, 2007.
Rosenberg, "U.S. Appl. No. 11/851,340", filed Sep. 6, 2007.
Rosenberg, "U.S. Appl. No. 11/841,868", filed Aug. 20, 2007.
Rosenberg, "U.S. Appl. No. 11/461,375", filed Nov. 9, 2006.
Rosenberg, "U.S. Appl. No. 11/555,784", filed May 24, 2007.
Rosenberg, "U.S. Appl. No. 11/563,610", filed Jun. 28, 2007.
Rosenberg, "U.S. Appl. No. 11/697,706", filed Aug. 16, 2007.
Rosenberg, "U.S. Appl. No. 11/618,858", filed Jun. 14, 2007.
Rosenberg, "U.S. Appl. No. 11/676,298", filed Jul. 5, 2007.
Rosenberg, "U.S. Appl. No. 11/697,732", filed Apr. 8, 2007.
Rosenberg, "U.S. Appl. No. 11/744,879", filed Sep. 20, 2007.
Rosenberg, "U.S. Appl. No. 11/775,314", filed Jul. 30, 2007.
"Bodybug Calorie Management System", downloaded from www.ubergizmo.com/15/archives/2005/03/boddybug_calori.html on Jul. 9, 2007, (Mar. 18, 2005).
"www.fitlinxx.com", downloaded from www.fitlinxx.com/brand/about_tour3.htm on Jul. 9, 2007, (2003).

\* cited by examiner

SYSTEM, METHOD AND COMPUTER PROGRAM PRODUCT FOR COLLABORATIVE BROADCAST MEDIA

CROSS-REFERENCE TO RELATED APPLICATIONS

The present application claims benefit and priority under 35 U.S.C. §119(e) from co-pending U.S. provisional patent application Ser. No. 60/720,071 filed Sep. 23, 2005;

this application is also a continuation in part of co-pending U.S. patent application Ser. Nos. 11/223,368 filed Sep. 9, 2005 and 11/285,534 filed Nov. 22, 2005; and, wherein co-pending U.S. patent application Ser. No. 11/223,368 claimed benefit and priority under 35 U.S.C. §119(e) from now expired U.S. provisional patent application Ser. Nos. 60/644,417 filed Jan. 15, 2005; and, wherein co-pending U.S. patent application Ser. No. 11/285,534 claimed benefit and priority under 35 U.S.C. §119(e) from now expired U.S. provisional patent applications Ser. Nos. 60/651,771 filed Feb. 9, 2005, 60/665,291 filed Mar. 26, 2005 and 60/648,197 filed Jan. 27, 2005; and, wherein co-pending U.S. application Ser. Nos. 11/267,079 filed Nov. 3, 2005, 11/427,320 filed Jun. 28, 2006, 11/354,667 filed Feb. 14, 2006, 11/367,178 filed Mar. 2, 2006 and PCT/US2006/004373 filed Feb. 7, 2006 are related applications; and lastly, all of the above referenced patent applications are to the instant inventor and a common assignee and are hereby incorporated by reference as if fully set forth herein.

FEDERALLY SPONSORED RESEARCH AND DEVELOPMENT

Not Applicable

REFERENCE TO A MICROFICHE APPENDIX

Not Applicable

RELEVANT FIELD

A data processing arrangement is described for collaborative broadcast media selection and more specifically, various exemplary embodiments provide a system, method and computer program product for collaboratively influencing media to be broadcast played by a media provider to a collaborative group of media players.

BACKGROUND

In recent years, traditional broadcasting such as radio has evolved from analog distribution of media content to digital streaming of media content. For example, satellite radio allows distribution of media content over a large geographic area with high fidelity and rapid data transfer rates. As disclosed in U.S. Pat. No. 6,314,094, to Boys et al., issued Jun. 11, 2001, and herein incorporated by reference, portable media players may be configured to receive broadcast media content over the internet as a digital data stream. This type of media player is sometimes referred to as internet radio receiver and may embodied in a wide range of portable computing devices such as laptops, personal data assistants (PDAs), cellular telephones, and like devices. While such technology enables users to access a wide range of media content as streamed digital data, it does not enable a plurality of users to collaboratively influence the media that is broadcast based upon real-time suggestions made by the media provider. Additionally, another limitation of the relevant art is that users are generally viewed as having equal privileges which may ignore important standing or stature among the collaborative group of users, for example registered subscribing listener versus anonymous listener.

Furthermore, while automated media selection systems enable individual users to express their long-term media preferences for consideration in media selection, such systems do not enable a group of users to collaboratively accept or reject media that is imminent to be broadcast played based the collaborative groups' current media desires. For example, a collaborative group's taste may over the long-term be determinative of what types of videos, music, genres of music, artists, actors, etc., that the collaborative group generally prefers to experience. However, the group's moment-to-moment media desires may vary widely based on contemporaneous influences which affect collaborative group's collective mood. The group's collective mood may often vary substantially during short durations of a typical day while the groups overall taste generally remain consistent over months or even years. For example, a group of users may collectively be partial to a particular song or video, rating it highly in a subjective measure of general preference, but at a given moment in time the group of users may collectively not be in the mood to experience the song or video.

Thus, automated and/or human-driven media distribution methods that rely solely upon a collaborative groups general long term tastes do not ensure that the collaborative group is receiving the broadcast media that is appropriate for the group's contemporaneous mood. Thus, there is a need for systems, methods, and computer program products, that enable collaborative groups of users to collaboratively influence broadcast media based upon their contemporaneous moods. Even more specifically, there is a need for systems, methods, and computer program products that enable individual users to express their moods and collaboratively accept or reject imminent media broadcasts that are suggested by a media provider.

SUMMARY

The various embodiments disclosed herein addresses the limitations in the relevant art and provides a system, method and computer program product for collaboratively influencing media that may be broadcast based upon real-time suggestions from a media provider. In an exemplary systematic embodiment, a system for collaborative media selection among a media provider and a collaborative group of media players, where each individual media player is in processing communications with the media provider and associated with a user is provided. The exemplary systematic embodiment comprises a media provider including a processor; a datastore functionally coupled to the processor having retrievably stored therein, a plurality of media files; each of the plurality of media files having retrievably associated therewith, identifying indicia descriptive of its associated media file.

A media suggestion application is provided which includes instructions executable by the processor to;

identify a suggested media file from among the plurality of media files for impending broadcast play to the collaborative group of media players;

retrieve from the datastore, the identifying indicia associated with the suggested media file;

contemporaneously send the identifying indicia associated with the suggested media file to the collaborative group of media players in general concurrence with a broadcast play of a current media file;

receive a plurality of separate user feedback responses associated with the suggested media file, the plurality of separate user feedback responses being received from a plurality of media players included in the collaborative group of media players; and, determine from the received plurality of separate user feedback responses if collaborative acceptance has been obtained for the suggested media file; and, if collaborative acceptance has been obtained, broadcast play the suggested media file to the collaborative group of media players such that the suggested media file plays generally following a completion of play of the current media file; or, if collaborative acceptance has been not been obtained, suggesting a different media file for impending broadcast play.

In a first related exemplary systematic embodiment, each of the collaborative group of media players comprises a microprocessor and a collaborative feedback application including instructions executable by the microprocessor to;

output an identifying representation of the suggested media file to the user associated with the media player;

determine a separate user feedback response regarding the user's preference for the suggested media file in dependence on the user's interaction with the media player;

send the separate user feedback response to the media provider; and, play the suggested media file for which collaborative acceptance has been determined.

In a second related exemplary systematic embodiment, the separate user feedback response is determined based upon the user expressing either an acceptance or a rejection of the suggested media file through an explicit interaction with the media player.

In a third related exemplary systematic embodiment, the collaborative feedback application further includes instructions executable by the microprocessor to provide a default separate user feedback response if the user fails to express either an acceptance or a rejection of the suggested media file through an explicit interaction with the media player within an allotted period of time.

In a fourth related exemplary systematic embodiment, the identifying indicia may include a unique identifier, a title, a graphical representation of an album cover, an artist name, a group name, a date, a genre, a playing time, and a trademark.

In a fifth related exemplary systematic embodiment, the media provider may be configured as a server in which the collaborative group of media players are clients thereof.

In a sixth related exemplary systematic embodiment, the identifying indicia may be broadcast to the collaborative group of media players generally simultaneously from the media provider.

In a seventh related exemplary systematic embodiment, the broadcast play may be accomplished using a streaming media process.

In an eighth related exemplary systematic embodiment, identifying the media file for suggestion from the plurality of media files may be performed at least in part using a random selection process.

In a ninth related exemplary systematic embodiment, identifying the media file for suggestion from the plurality of media files may be performed at least in part using a weighted random selection process.

In a tenth related exemplary systematic embodiment, identifying the media file for suggestion from the plurality of media files is performed at least in part using retrievably stored user preference data for at least one user associated with at least one of the plurality of separate media players included in the collaborative group of media players.

In an eleventh related exemplary systematic embodiment, collaborative acceptance of the suggested media file may be determined at least in part on an affirmative majority of the plurality of separate user feedback responses received by the media provider.

In a twelfth related exemplary systematic embodiment, collaborative acceptance of the suggested media file may be determined at least in part on exceeding a preestablished threshold of affirmative responses among the plurality of separate user feedback responses received by the media provider.

In a thirteenth related exemplary systematic embodiment, at least one of the plurality of separate user feedback responses may be given non-equal weighting with respect to other of the plurality of separate user feedback responses received by the media provider for determination of the collaborative acceptance.

In a fourteenth related exemplary systematic embodiment, the non-equal weightings may be dependent at least in part upon non-equal priority levels assigned to one or more particular users associated with the individual media players.

In a fifteenth related exemplary systematic embodiment, the collaborative feedback application may further include instructions executable by the microprocessor to alert its associated user to receipt of the identifying indicia sent from the media provider.

In a sixteenth related exemplary systematic embodiment, the alert may include an audible alert, a visual alert, a tactile alert and any combination thereof.

In a seventeenth related exemplary systematic embodiment, identifying a media file for suggestion may be based at least in part upon a user's input.

In an eighteenth related exemplary systematic embodiment, the suggested media file may be broadcast played to the collaborative group of media players such that broadcast play of the suggested media file begins immediately following the broadcast play of the current media file.

In an exemplary methodic embodiment, a method for collaborative media selection among a media provider and a collaborative group of media players, each individual media player, where the media players are in processing communications with the media provider and associated with a user. The exemplary method comprising a media suggestion application including instructions executable by a media provider processor for;

identifying a suggested media file among a plurality of retrievably stored media files for impending broadcast play to the collaborative group of media players;

retrieving identifying indicia associated with the suggested media file;

contemporaneously sending the identifying indicia associated with the suggested media file to the collaborative group of media players in general concurrence with a broadcast play of a current media file;

receiving a plurality of separate user feedback responses associated with the suggested media file, the plurality of separate user feedback responses being received from a plurality of media players included in the collaborative group of media players; and, determining from the received plurality of separate user feedback responses if collaborative acceptance has been obtained for the suggested media file; and, if collaborative acceptance has been obtained, broadcast playing the suggested media file to the collaborative group of media players such that the suggested media file plays generally following a completion of play of the current media file; or, if collaborative acceptance has been not been obtained, suggesting a different media file for impending broadcast play.

In a first related exemplary methodic embodiment, the method further comprises a collaborative feedback application including instructions executable by a media player microprocessor for;

outputting an identifying representation of the suggested media file in dependence on receipt of the identifying indicia to the user associated with each individual media player;

determining a separate user feedback response regarding the user's preference for the suggested media file in dependence on the user's interaction with the media player;

sending the separate user feedback response to the media provider; and, playing the suggested media file for which collaborative acceptance has been determined.

In a second related exemplary methodic embodiment, the separate user feedback response is determined based upon the user expressing either an acceptance or a rejection of the suggested media file through an explicit interaction with the media player.

In a third related exemplary methodic embodiment, the collaborative feedback application further includes instructions executable by the microprocessor to provide a default separate user feedback response if the user fails to express either an acceptance or a rejection of the suggested media file through an explicit interaction with the media player within an allotted period of time.

In a fourth related exemplary methodic embodiment, the collaborative feedback application further includes instructions executable by the microprocessor for alerting the user of a receipt of the identifying indicia sent from the media provider.

In a fifth related exemplary methodic embodiment, the collaborative acceptance of the suggested media file may be determined at least in part on one or more of; a majority of the plurality of separate user feedback responses being affirmative responses, the affirmative responses exceeding a predetermined proportion of feedback responses, and the affirmative feedback responses cumulatively exceeding a predetermined threshold.

In a sixth related exemplary methodic embodiment, the collaborative acceptance of the suggested media file may be determined at least in part on a weighted tally of at least one of the plurality of separate user feedback responses.

In a seventh related exemplary methodic embodiment, at least one of the plurality of separate user feedback responses may be given non-equal weightings with respect to other of the plurality of separate user feedback responses in the determination of the collaborative acceptance.

In an eighth related exemplary methodic embodiment, the non-equal weightings are dependent at least in part upon non-equal priority levels associated with one or more particular users associated with each of the individual media players.

In an exemplary computer program product embodiment, a computer program product embodied in a tangible form is provided. The exemplary computer program product comprises instructions executable by a media provider processor to;

identify a suggested media file among a plurality of media files for impending broadcast play to a collaborative group of individual media player processors in processing communications with the media provider processor; where the plurality of media files are retrievably stored in a datastore coupled to the media provider processor and each media file having associated therewith, a retrievably stored identifying indicia;

retrieve the identifying indicia associated with the suggested media file;

contemporaneously send the identifying indicia associated with the suggested media file to the collaborative group of media players in general concurrence with a broadcast play of a current media file;

receive a plurality of separate user feedback responses associated with the suggested media file, the plurality of separate user feedback responses being received from a plurality of media players included in the collaborative group of media player processors; and, determine from the received plurality of separate user feedback responses if collaborative acceptance has been obtained for the suggested media file; and, if collaborative acceptance has been obtained, broadcast play the suggested media file to the collaborative group of media players such that it plays after the completion of play of the current media file; or, if collaborative acceptance has been not been obtained, suggest a different media file for impending broadcast play.

In a first related exemplary computer program product embodiment, the computer program product further comprises instructions embodied in a tangible form executable by each of the collaborative group of individual media player processors to;

output an identifying representation of the suggested media file to a user associated with each individual media player;

determine a separate user feedback response regarding the user's preference for the suggested media file in dependence on the user's interaction with the media player;

send the separate user feedback response to the media provider processor; and, play the suggested media file for which collaborative acceptance has been determined.

In a second related exemplary computer program product embodiment, the computer program product further comprises instructions embodied in a tangible form executable by the media provider processor to determine collaborative acceptance of the suggested media file based at least in part upon a majority or weighted tally of affirmative responses included in at least a portion of the plurality separate user feedback responses received by the media provider processor.

In a third related exemplary computer program product embodiment, the tangible form may include logical media, optical media and magnetic media.

The various exemplary systematic and methodic embodiments described above are provided in related numeric embodiments for convenience only. No limitation to the various exemplary embodiments disclosed is intended.

BRIEF DESCRIPTION OF DRAWINGS

The features and advantages will become apparent from the following detailed description when considered in conjunction with the accompanying drawings. Where possible, the same reference numerals and characters are used to denote like features, elements, components or portions. Optional components or feature are generally shown in dotted lines. Boundaries of separate devices are generally shown in dashed line. It is intended that changes and modifications can be made to the described embodiment without departing from the true scope and spirit of the subject invention as defined by the claims.

DETAILED DESCRIPTION

The invention provides a system, method and computer program product which allows a plurality of users, each in possession of a suitably configured media player, to collaboratively influence the media content distributed to them by a broadcaster. Where necessary, computer programs, routines and algorithms are envisioned to be programmed in a high level language, for example CORBA, Java™ C++, C, C#, or Visual Basic™. The resulting applications allow each user of the plurality of media players to receive real-time suggestions for imminent media to be played from a broadcaster via a communication network with a media provider. For purposes of this disclosure, the term broadcast is intended to include multicast. One skilled in the art will appreciate that the term "applications" refers to programs, code, objects, applets, routines, functions, subroutines, and associated data retrieved from dynamic linked libraries, methods and like data structure.

The various applications described herein may also allow each user associated with the media players to provide a selective response to each of the received media suggestions, each response being entered by each individual user through a user interface of their media player, each response being communicated to the media provider over a communication network as, for example, a digital message, each response indicating a user's acceptance, rejection, and/or subjective partiality to the suggested media.

Upon receiving the selective responses from a plurality of users for a given media suggestion, the media provider determines based upon a conditional analysis of the received responses whether or not to imminently broadcast the suggested media to the media players of the collaborative group of users. In this way, each user may participate in the collaborative selection of media that will be broadcast by the media provider in the impending near future. In general, the impending near future means an accepted media file suggestion would be played soon after a currently playing media file completes play. Thus, real-time feedback responses are provided by each of the separate users which correspond to their contemporaneous mood in media, not merely their long-term tastes or preferences in media.

Figure 1:
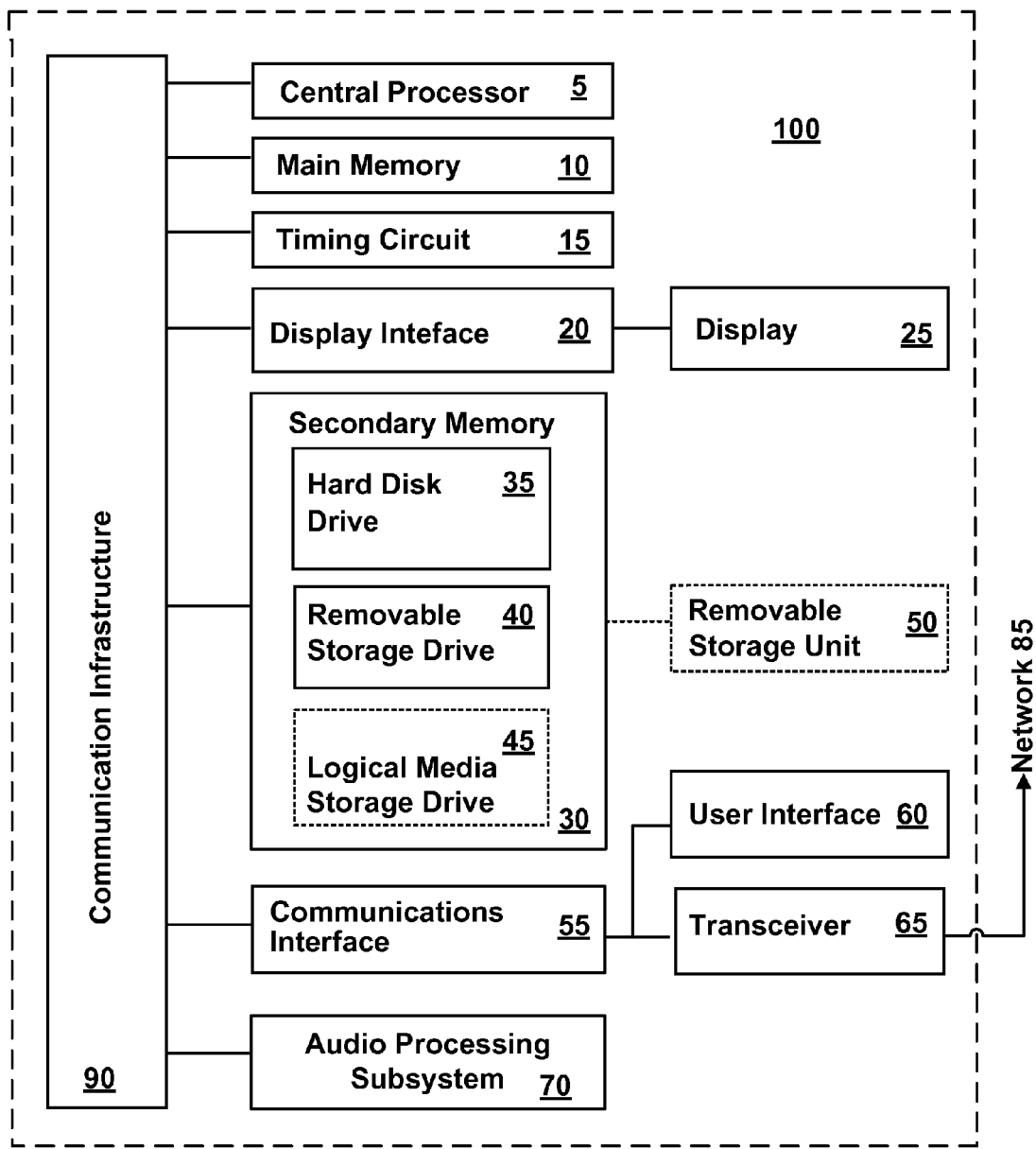
FIG. 1—depicts a generalized exemplary block diagram of a media provider.

Referring to FIG. 1, a generalized block diagram of a media provider 100 is depicted. The media provider 100 includes a communications infrastructure 90 used to transfer data, memory addresses where data items are to be found and control signals among the various components and subsystems of the media provider 100.

A central processor 5 is provided to interpret and execute logical instructions stored in the main memory 10. The main memory 10 is the primary general purpose storage area for instructions and data to be processed by the central processor 5. The main memory 10 is used in its broadest sense and includes RAM, EEPROM and ROM. A timing circuit 15 is provided to coordinate activities within the media provider 100. The central processor 5, main memory 10 and timing circuit 15 are directly coupled to the communications infrastructure 90.

A display interface 20 is provided to drive a display 25 associated with the media provider 100. The display interface 20 is electrically coupled to the communications infrastructure 90 and provides signals to the display 25 for visually outputting both graphics and alphanumeric characters. The display interface 20 may include a dedicated graphics processor and memory to support the displaying of graphics intensive media. The display 25 may be of any type (e.g., cathode ray tube, gas plasma).

A secondary memory subsystem 30 is provided which houses retrievable storage units such as a hard disk drive 35, a removable storage drive 40, an optional logical media storage drive 45 and an optional removal storage unit 50.

The removable storage drive 40 may be a replaceable hard drive, optical media storage drive or a solid state flash RAM device. The logical media storage drive 45 may be flash RAM device, EEPROM encoded with playable media, or optical storage media (CD, DVD). The removable storage unit 50 may be logical, optical or electromechanical (hard disk).

A communications interface 55 subsystem is provided which allows for standardized electrical connection of peripheral devices to the communications infrastructure 90 including, serial, parallel, USB, network and Firewire connectivity. For example, a user interface 60 and a transceiver 65 are electrically coupled to the communications infrastructure 90 via the communications interface 55. For purposes of this disclosure, the term user interface 60 includes the hardware and operating software by which a user executes procedures on the media provider 100 and the means by which the media provider 100 conveys information to a user.

Figure 2:
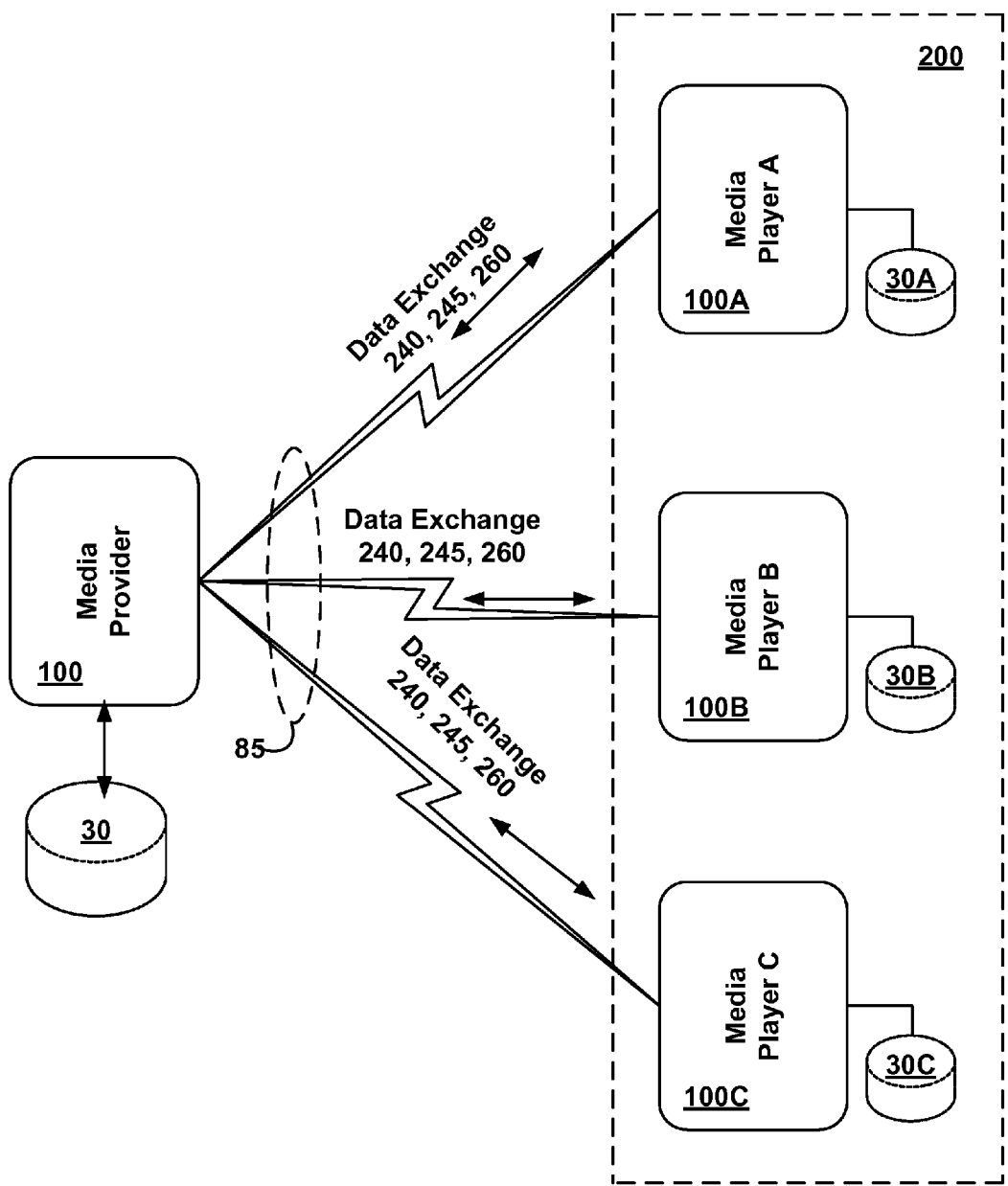
FIG. 2—depicts an exemplary embodiment where a media provider is in processing communications with a plurality of media players.

The user interface 60 employed on the media provider 100 may include a pointing device (not shown) such as a mouse, thumbwheel or track ball, an optional touch screen (not shown); one or more pushbuttons (not shown); one or more sliding or circular rheostat controls (not shown), and one or more switches (not shown.) One skilled in the relevant art will appreciate that the user interface devices which are not shown are well known and understood. The user interface 60 may be provided at a terminal or other station for use by a human operator such as a contemporaneous disc jockey (DJ) or other media specialist. The human operator may, in some embodiments, provide input through the user interface 60 that dictates or otherwise influences the media suggestions that are selected by media provider 100 and broadcasted to a collaborative group of media players 100 A,B,C (FIG. 2.)

In some embodiments, the human operator may select a particular media for suggestion and cause it to be electronically suggested to a particular collaborative group of media players 100 A,B,C by engaging the user interface 60 of the media provider 100.

A transceiver 65 is provided to facilitate the remote exchange of data between the media provider 100 and each media player 100A, 100B, 100C coupled to a telecommunications network 85.

The transceiver 65 may be a radio frequency type normally associated with computer networks for example, wireless computer networks based on BlueTooth™ or the various IEEE standards 802.11.sub.x., where x denotes the various present and evolving wireless computing standards. Alternately, digital cellular communications formats compatible with for example GSM, 3G and evolving cellular communications standards. Both peer-to-peer (PPP) and client-server models are envisioned for the various embodiments disclosed herein. For example, one media player 100A in the group of collaborating media players 100 A,B,C may act as the media provider 100. As such, the media provider 100 responsibility may be transferred to any of member of the collaborating group of media players 100 A,B,C.

In a third alternative embodiment, the transceiver 65 may include hybrids of computer communications standards, cellular standards and evolving satellite radio standards. The media provider 100 includes an operating system, the necessary hardware and software drivers necessary to fully utilize the devices coupled to the communications infrastructure 90, and a media suggestion application operatively loadable into the main memory 10. A detailed explanation of the media suggestion application is provided in the discussion accompanying FIGS. 2, 2A, 2B and 3.

Lastly, an audio processing subsystem 70 is provided and electrically coupled to the communications infrastructure 90. The audio processing subsystem 70 is configured for the broadcast or multicast play of digitally represented media content, for example, music or multimedia encoded in any of the exemplary formats MP3, AVI, WAV, MPG, QT, WMA, AIFF, AU, RAM, RA, MOV, MIDI, etc. As referred to in this specification, "media" refers to video, audio, streaming media and any combination thereof. In addition, the audio processing subsystem 70 is envisioned to optionally include features such as graphic equalization, volume, balance, fading, base and treble controls, surround sound emulation, and noise reduction. One skilled in the relevant art will appreciate that the above cited list of file formats is not intended to be all inclusive.

The media provider 100 includes an operating system, the necessary hardware and software drivers necessary to fully utilize the devices coupled to the communications infrastructure 90, media play and broadcast feedback functions are enabled by at least one application (i.e., a media suggestion application 225, FIG. 2A) operatively loaded into main memory 10. Optionally, the media provider 100 is envisioned to include at least one remote authentication application, one or more cryptography applications capable of performing symmetric and asymmetric cryptographic functions, and secure messaging software. One skilled in the art will appreciate that the media provider 100 may have comprise a single unit with a single processor or may be embodied as a plurality of units and/or a plurality of processors that work in concert to perform the required media providing functions, for example to allow for scaling of the media provider functionality.

Figure 1A:
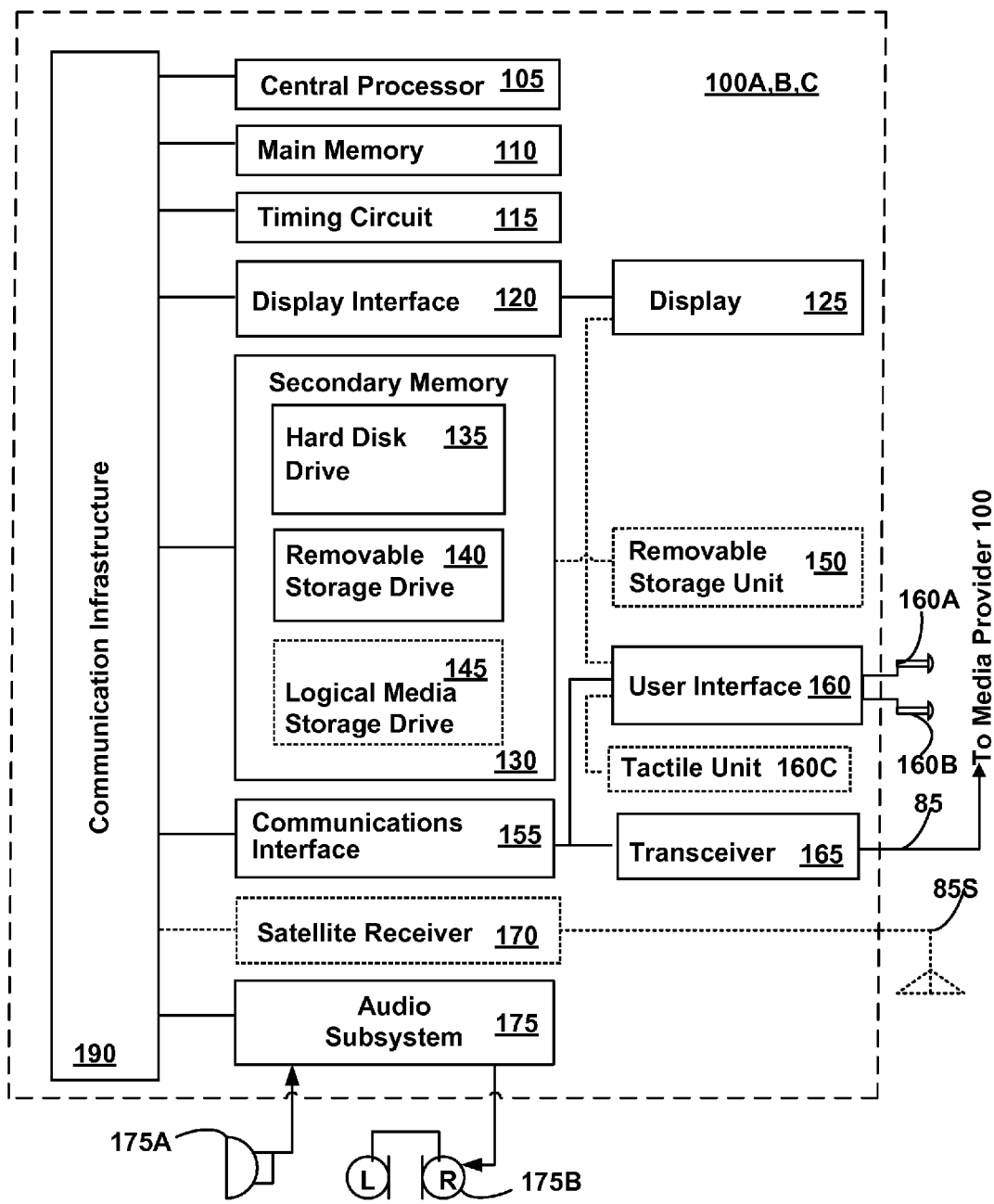
FIG. 1A—depicts a generalized exemplary block diagram of a media player.

FIG. 1A depicts a general block diagram of the media players 100 A,B,C which are coupled to the media provider 100 over the telecommunications link 85. In an exemplary embodiment, the media players 100 A,B,C are provided in a portable form factor to be carried by a user. In an alternate embodiment, the media players 100 A,B,C are provided as applications or sub-applications which utilize the existing resources of a host electronic device. For example, an applet which interfaces with a local browser installed on the electronic device to communicate with the media provider 100 over a public network 85, for example the Internet.

Analogous to the media provider 100 each media player 100 A,B,C includes a communications infrastructure 190 used to transfer data, memory addresses where data items are to be found and control signals among the various components and subsystems of the media player 100 A,B,C.

A microprocessor 105 is provided to interpret and execute logical instructions stored in the main memory 110. The main memory 110 is the primary general purpose storage area for instructions and data to be processed by the microprocessor 105. The microprocessor 105, main memory 110 and timing circuit 15 are directly coupled to the communications infrastructure 190.

A display interface 120 is provided to drive a display 125 associated with the media players 100 A,B,C. The display interface 120 is electrically coupled to the communications infrastructure 190 and provides signals to the display 125 for visually outputting both graphics and alphanumeric characters. As with the media provider 100, the display interface 120 may include a dedicated graphics processor and memory to support the displaying of graphics intensive media. The display 125 is generally of a low power consuming type, for example, a liquid crystal display (LCD.)

A secondary memory subsystem 130 is provided which houses retrievable storage units such as a hard disk drive 135, a removable storage drive 140, an optional logical media storage drive 145 and an optional removal storage unit 150.

A communications interface 155 subsystem is provided which allows for electrical connection of peripheral devices to the communications infrastructure 190 including, serial, parallel, USB, network and Firewire connectivity.

A user interface 160 and a transceiver 165 are electrically coupled to the communications infrastructure 90 via the communications interface 155.

The user interface 160 employed on the media player 100 may include one or more pushbuttons 160 A,B one or more sliding or circular potentiometer controls (not shown), one or more switches (not shown), a tactile feedback unit 160C, as well as unique tools for user input and output such as a head-nod sensor, a voice input sensor, voice output routines and components, and/or other interface routines and components as are disclosed in the instant inventor's co-pending patent application Ser. No. 11/285,534 filed Nov. 22, 2005. The tactile feedback unit 160C may be used to provide a vibratory alert to a user of the media player 100 A,B,C. One skilled in the relevant art will appreciate that the user interface devices which are not shown are well known and understood.

A transceiver 165 is provided to facilitate the exchange of data between the media player 100 and the media players 100 A,B,C via the telecommunications network 85.

The transceiver 165 is intended to be compatible with the transceiver 65 installed on the media provider 100. In an exemplary embodiment, the transceiver 165 includes a traditional IEEE standard 802.11.sub.x. networking unit and optionally, a satellite radio receiver 170. In a third alternative embodiment, the transceiver 65 may include hybrids of computer communications standards, cellular standards and evolving satellite radio standards.

An audio subsystem 170 is provided and electrically coupled to the communications infrastructure 190. The audio subsystem is configured for the play of digitally represented media, for example, music media or multimedia encoded in any of the exemplary formats MP3, AVI, WAV, MPG, QT, WMA, AIFF, AU, RAM, RA, MOV, MIDI, etc. The audio subsystem includes a microphone input port 175A and a headphone or speaker output port 175B.

Connection of the microphone 175A and/or headset 175B includes both traditional cable and wireless arrangements known in the relevant art. One skilled in the relevant art will appreciate that the above cited list of file formats is not intended to be all inclusive.

In portable embodiments, each of the media players 100 A,B,C includes an operating system, the necessary hardware and software drivers necessary to fully utilize the devices coupled to the communications infrastructure 190, media play and user feedback functions are enabled by at least one application (i.e., a collaborative feedback application; 255 FIG. 2A) operatively loaded into main memory 110. The media players 100 A,B,C may include at least one remote authentication application compatible with that of the media provider 100, one or more cryptography applications capable of performing symmetric and asymmetric cryptographic functions, and secure messaging functions.

Referring to FIG. 2, a generalized exemplary embodiment is depicted where a media provider 100 is in processing communications over a network 85 with three media players 100 A,B,C arranged in a collaborative group 200. In this exemplary embodiment, the media provider 100 exchanges data 240, 245, 260 (FIG. 2) with the collaborative group 200 of media players 100 A,B,C. The users associated with each of the collaborative group 200 of media players 100 A,B,C do not necessarily have to be known to one another as the collaborative group 200 may be defined by the media provider 100 based on similar user preferences or by each user agreeing to be part of a particular collaborative group 200. Alternately the users associated with collaborative group 200 may have explicitly joined or otherwise defined the collaborative group using selection process associated with the present invention, for example defining a collaborative group among a set of friends who desire a shared media experience.

In some such embodiments, the users access the media provider 100 remotely through a web browser or other terminal program and engage a configuration process whereby the users define a collaborative group by indicating unique ID values for each of their individual media players 100 A,B,C and/or each of their persons.

In some embodiments a password or other authentication value may be required of a user desiring to join a particular collaborative group 200. The data exchanged includes identifying indicia 240 associated with a suggested media file 245 (FIG. 2A) for play sent from the media provider 100 to each of the media players 100 A,B,C. Each user, after receiving the identifying indicia 240 enters a feedback response 260 via the user interfaces 160 associated with each of the media players 100 A,B,C which is then sent over the network 85 to the media provider 100 for tallying. It should be noted that upon receiving the identifying indicia 240, the individual media player of each user in the collaborative group displays to that user an identifying representation of the suggested media file 245. This identifying representation may be displayed visually or may be output aurally. For example, the display of each media player 100 may visually output the title of the suggested media file using graphical processes and/or may aurally announce the title of the suggested media file using speech synthesis processes. The suggestion and feedback processes are generally performed concurrently with the broadcast of a previously suggested and collaboratively accepted media file 245 to the collaborative group of media players 100 A,B,C.

Figure 2A:
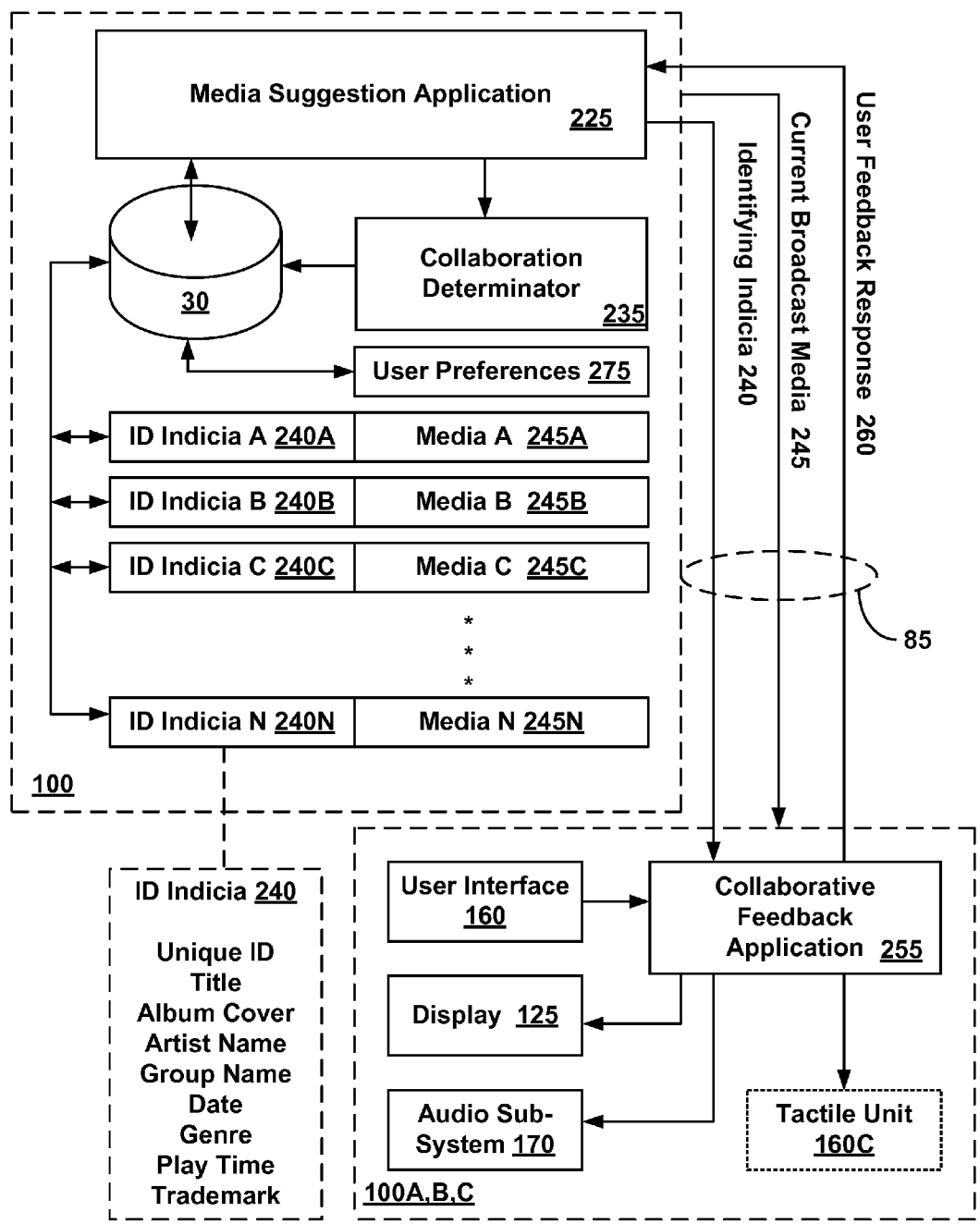
FIG. 2A—depicts an exemplary embodiment where a media suggesting application is exchanging information with a media playing application.

Referring to FIG. 2A, an exemplary embodiment of the functional relationships between the media suggestion application 225 operating on the media provider 100 and the collaborative feedback application 255 operating on each of the media players 100 A,B,C is depicted. A variety of programming techniques may be employed to accomplish the various embodiments disclosed. For example, the media suggestion application 225 may be programmed as a parent or main program which controls the collaborative feedback application 255. In such an arrangement, the collaborative feedback application 255 may exist as an Java™ applet, a remotely invokeable method (RMI), Windows™ distributed component object model, IBM™ distributed system object model (DSOM) object or similar arrangement in which the collaborative feedback application 255 is invoked by the media suggestion application 225.

The media suggestion application 225 may also be programmed as a server application which exchanges data with the collaborative feedback application 255 acting as a client in a client-server relationship. Other programming techniques may be used as well which allows for cross network data exchange between the media suggestion application 225 and each instance of collaborative feedback applications 255 found in a collaborative group 200. The media suggestion application 225 is programmed to access a database 30 containing a library of media files 245 A,B,C-N for intended broadcast play. Each media file 245 has associated therewith, a retrievable identifying indicia 240 A,B,C-N. In general the identifying indicia 240 for a particular media file include one or more pieces of data that uniquely identify that media file with respect to all other media files.

The selection of a media file 245 may be made using a random selection process, a sequential selection process, an elimination selection process, or an intelligent media selection process such as one or more of the processes disclosed in co-pending U.S. patent application Ser. Nos. 11/267,079 filed Nov. 3, 2005 and 11/285,534 filed Nov. 22, 2005 by the instant inventor, both of which are hereby incorporated by reference, or any combination of these processes.

For example, a weighted random selection process may be employed that considers the media taste preferences, media exposure histories, and/or other personal preference and/or personal historical data associated with one or more of the collaborating users. In some embodiments the selection of the media file 245 may be influenced or directly indicated by a human operator of the media provider 100 system. For example a "DJ" or other media selection specialist may personally influence or directly indicate through a user interface 60 of the media provider 100, the media file, set of media files, order of media files, or weightings of media files to be used in the media suggestion process.

Once a media file 245 is identified for suggested play by the media suggestion application 225, the identifying indicia 240 associated with the identified media file 245 is then sent over the network 85 to each of the individual the media players 100 A,B,C of the collaborative group 200 by the media suggestion application 225. The identifying indicia 240 may include only a coded identification value that uniquely specifies the media file 245, or may include descriptive content such as the title, artist, playing time, album name, and album cover imagery.

Thereafter, each collaborative feedback application 255 receives the broadcasted identifying indicia 240 and alerts the user associated media player 100 A,B,C that a identified media 245 for play is available for providing user feedback 260. The alert may be provided in tactile 160C, visual 125 and/or audible forms 170. This alert is generally accompanied by and/or comprises an output of data that identifies the suggested media file to the user. In some embodiments the output identifying representation data was received as part of the indicia 240 from the media provider 100. In other embodiments the identifying representation data is accessed from a local datastore 30 A,BC available to the media player 200 through a relational reference to the received identifying indicia 240

The media players 100 A,B,C may be programmed such that receipt of the incoming identifying indicia 240 causes an alert to be generated to inform the user that a suggested media is available for receiving user feedback. Each user then inputs his or her feedback responses into the user interface 160 associated with their particular media player 100 A,B,C and the feedback responses 260 are sent over the network 85 to the media suggestion application 225 for tallying.

The user feedback responses 260 are used to determine whether the suggested media item should be played 245. In some embodiments, a default feedback response is provided over network 85 by a media player 100 A,B,C if the user of that media player 100 A,B,C does not provide a feedback response through a user interface 160 within a predetermined time period (i.e., time constraint). In some such embodiments the user may configure the state of the default feedback response using a preference setting configured by that user. Thus, some users may configure the collaborative feedback application 255 to automatically provide an affirmative response, if no response is provided by the user to the suggested media file. Other users may configure the collaborative feedback application 255 to automatically provide a negative response, if no response is provided by the user to the suggested media file.

In an exemplary embodiment, a collaborative determinator function 235 of the media suggestion application 225 performs the tallying and determines if collaborative acceptance of the identified media file 245 A,B,C-N has been obtained. If collaborative acceptance has been obtained among the collaborative group 200 for the play of the suggested media 245 A,B,C-N, the suggested media 245 A,B,C-N is scheduled for broadcast play, generally soon after a currently playing media 245 has completed play. Alternately, if the suggested media 245 A,B,C-N is collaboratively rejected, the process may be repeated where another media may be identified and suggested for play.

In an exemplary embodiment, determination of collaborative acceptance is obtained when a majority of users indicate collaborative acceptance of the suggested media 245 A,B,C-N. Alternatively if more than a certain percentage of users indicate acceptance of a suggested media 245 A,B,C-N, collaborative acceptance is obtained. Alternatively if the mean of the partiality ratings provided by users for a suggested media 245 A,B,C-N is above a predefined level, collaborative acceptance is obtained. Alternatively if the weighted mean of partiality ratings provided by users is above a predetermined level, collaborative acceptance is obtained. The collaborative determinator function 235 may be a separate process, application, routine, applet or application which is called by the media suggestion application 225. One skilled in the art will appreciate that a multitude of procedural and object oriented programming mechanisms may be employed to accomplish the tallying function.

In another exemplary embodiment, if the media provider 100 does not receive a feedback response within a predefined time period from a particular media player 100 A,B,C, a default feedback response may be assigned to that media player 100 A,B,C, in the tallying and determination process.

The default action may automatically accept or reject the suggested media, or may cast a default subjective partiality rating for the suggested media 245 A,B,C-N, or may waive the right to express partiality towards the suggested media(s) 245 A,B,C-N in a current user feedback cycle. Thus, while it was previously described that in some embodiments, a user's portable media player may report a default user feedback response 260 for that user if that user does not provide an overt response to a suggested media file 245 A,B,C-N, an alternate embodiment is one in which the media provider 100 assigns a default user feedback response if none is received from a particular media player 100 A,B,C.

The user feedback 260 and tallying process generally occurs concurrently with the broadcast play of the current media file 245. The identifying indicia 240 may include the title of the suggested media file, a unique identifier, a title, a graphical representation of an album cover, an artist name, a group name, a date, a genre, a playing time, a trademark and any combination thereof. In an exemplary embodiment, the unique identifier may be used to locally match and retrieve additional media file information which is stored in datastores 30A,B,C (FIG. 2) coupled to each of the media players 100 A,B,C.

In another exemplary embodiment, the tallying and determination process may be optionally weighed such that the user feedback responses 260 from some users in the collaborative group are counted more heavily in the determination process than the user feedback response 260 from other users in the collaborative group. The weightings associated with particular users (or particular media players used by particular users) may be based upon priority levels that are optionally assigned to some or all of the plurality of users. In other related exemplary embodiments, at least one of the individual users may be assigned a higher priority level than another of the individual users, the user feedback response 260 associated with the higher-priority user having a greater influence upon the tally than the response provided by a lower-priority user.

Based upon the computed tally, the media suggestion application 225 performs a conditional analysis in which the suggested media 245 A,B,C-N is either collaboratively accepted for play or rejected for play. In other related exemplary embodiments, weighting mechanisms may be provided for determining an average partiality rating provided by the users for an suggested media 245 A,B,C-N requiring exceeding a predetermined threshold before being collaboratively accepted. In other related exemplary embodiments, a certain percentage or proportion of users within the collaborative group must provide affirmative user feedback response 260, either directly or through automated defaults, for the suggested media file 245 A,B,C-N to be accepted. For example, the system may be configured such that 65% of the user feedback responses provided with respect to a suggested media file 245 A,B,C-N must be affirmative for the media file to be collaboratively accepted. In some such embodiments the users may configure the threshold percentage employed.

In other exemplary embodiments, the user feedback responses 260 are collected by the media provider 100 for a predetermined amount of time following a suggested media file 245 A,B,C-N. Once the predetermined amount of time elapses, only those user feedback responses 260 received are used in the tally and determination process. In other embodiments, user feedback responses are collected by the media provider 100 until a predetermined number or predetermined percentage of user feedback responses 60 is collected from the collaborative group of media players 100 A,B,C. Once the predetermined number or percentage of user feedback responses 260 is received, only those responses are used in the tally an determination process. For example, the media provider 100 may be configured such that after 80% of the individual media players 100 A,B,C in the collaborative group have provided user feedback responses 60, the tally and determination process is performed.

Finally, in some embodiments user feedback responses may be collected until both a predetermined amount of time elapses and a minimum number or percentage of user feedback responses 60 are received. This arrangement ensures that all users have at least a predetermined amount of time available to respond as well as ensuring that at least a minimum number or percentage of users participate prior to the tally and determination. With respect to weighted tallying processes in which the user feedback responses 260 from certain users have a greater impact upon the determination process than user feedback responses from other users, a variety of methods may be used to assign higher priority levels to certain users. In one such embodiment, a user's priority level may be determined based upon the length of time that that user has been a member of a particular collaborative group or a user of the media provider service. In this way user's who have been members of a particular collaborative group for a longer period of time, and/or user's who have been patrons to the media provider service for a longer period of time, may be assigned a higher priority level and therefore may have a greater influence upon the tally and determination process than other users who have lower priority.

In an alternate embodiment the weighting assigned to a particular user feedback response 260 may be determined or assigned based upon the order in which the user feedback response 260 was received, the user feedback response 260 received first being assigned a higher weighting in the tally and determination process than the user feedback responses 260 received afterward. In this way users are rewarded with increased impact upon the collaborative decision process in return for responding more quickly to a media suggestion 245 A,B,C-N.

In an alternate embodiment, user provided user feedback responses 260 are weighted more heavily in the tally and determination process than default provided user feedback responses 260. In this way users are rewarded with increased influence upon the collaborative decision process if they explicitly provide a user feedback response 260 as opposed to allowing a default process to provide their user feedback response 260.

In another alternate embodiment, user's are provide a higher priority level and thus a higher weighting in the tally and determination process based upon their historical accuracy in providing feedback responses 260 to media suggestions 245 A,B,C-N. If their feedback responses 260 frequently agree with the collaborative decision reached by the group, their priority and thus weighting level is increased. If their feedback responses 260 often disagree with the collaborative decision reached by the group, their priority and thus weighting level is decreased. In this way users whose feedback responses often represent the will of the collaborative group are given a higher weighting in the tally and determination process while users whose feedback responses often conflict with the will of the collaborative group are given lower weighting in the tally and determination process.

In yet another exemplary embodiment, a database of user preferences 275 may be used by the media provider 100 to heuristically determine future media suggestions 245 A,B, C-N to be sent to the users of the media players 100 A,B,C, the playing of the suggested media 245 A,B,C-N being dependent upon the collaborative decision-making process of the then current users as disclosed herein. The heuristic processes used to determine future media suggestions may include processes disclosed in co-pending U.S. patent application Ser. Nos. 11/267,079 and 11/285,534 by the present inventor.

In this way the present invention may make suggestions to the collaborative group of users employing data that reflects the long-term media tastes of the members of the collaborative group and then may enable real-time user feedback responses that are used to accept or reject the suggested media items based upon the substantially current media mood of the members of the collaborative group.

It should be noted that in some embodiments the user preference and/or taste related values employed by the heuristic selection processes may be weighted such that users with higher priority level have a greater influence upon the heuristic selection process than users of lower priority level. In this way, for example, user's who have been in the collaborative group longer or who have been members of the media service longer, may have their personal preferences and/or tastes provide a greater impact upon the selection process for media suggestions than other users.

Figure 2B:
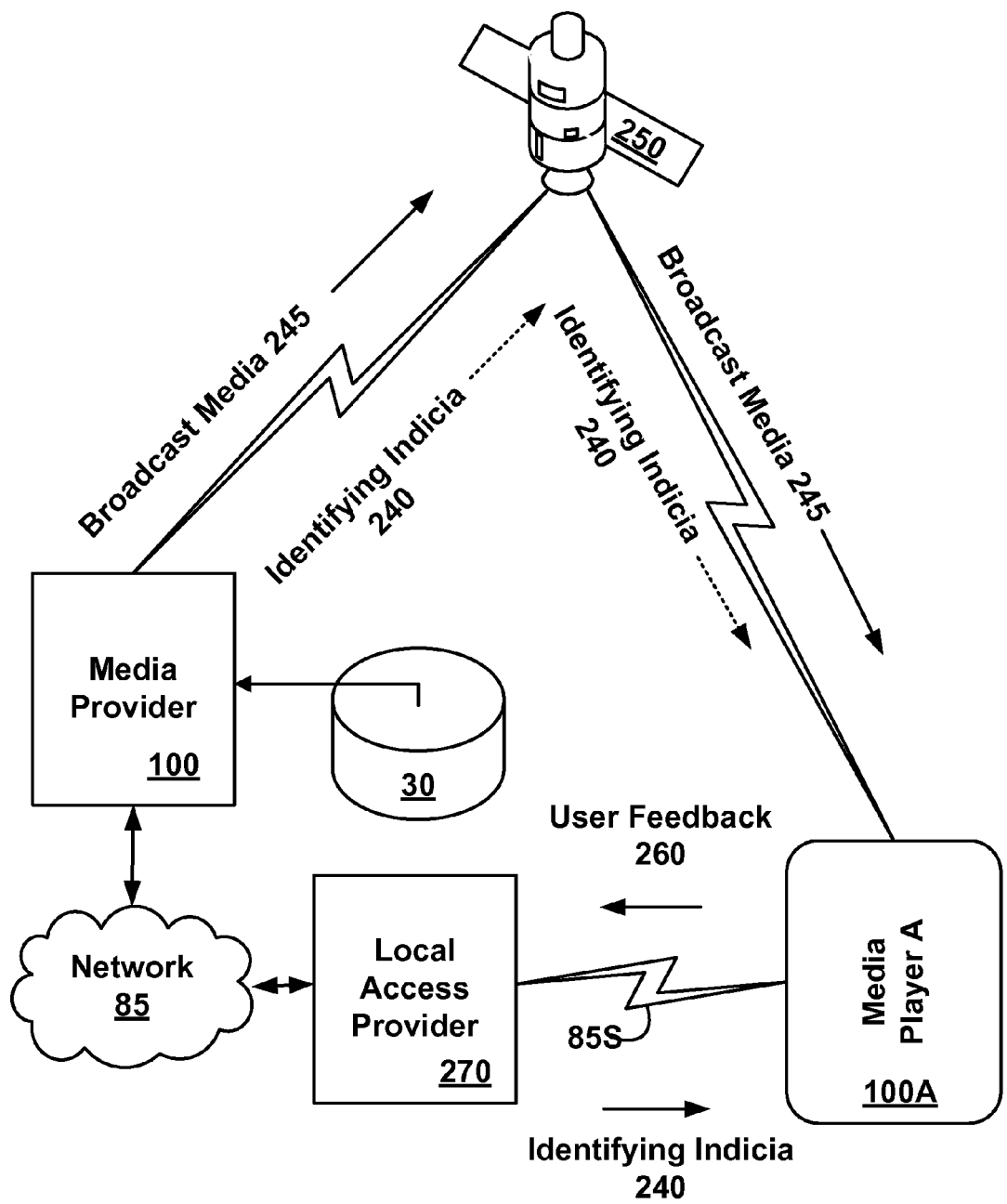
FIG. 2B—depicts an exemplary embodiment where a media player is receiving a broadcast media using a satellite link.

Referring to FIG. 2B, another exemplary embodiment is depicted. In this exemplary embodiment, a media player 100A sends and receives data from the media provider 100 either over a public network 85S and local access provider 270 or via an earth station (not shown) to a satellite 250. In one exemplary embodiment, the media player 100A sends user feedback data 260 to the media provider 100 over public networks 85, 85S via a local access provider 270. In this exemplary embodiment, the media player 100A receives identifying indicia 240 from the media provider 100 over the public networks 85, 85S via a local access provider 270. The local provider 270 may be for example, a cellular telephone service or wireless hotspot service. The broadcast media 240 is then transmitted by satellite 250.

This exemplary embodiment is intended to take advantage of the digital broadcast capabilities of the latest generation of satellite broadcast providers (e.g., XM™, Sirius™).) The broadcast capabilities of the satellite providers have ample capacity either directly in a main carrier or a sub channel to broadcast collaboratively accepted media 245 at high data rates, thus minimizing the waiting time associated with large file transfers occurring over wireless networks. In another related exemplary embodiment, the identifying indicia are sent to the media player 100A via the satellite 250. In this exemplary embodiment, the user feedback 260 is sent to the media provider 100 using public networks 85, 85S as before.

Figure 3:
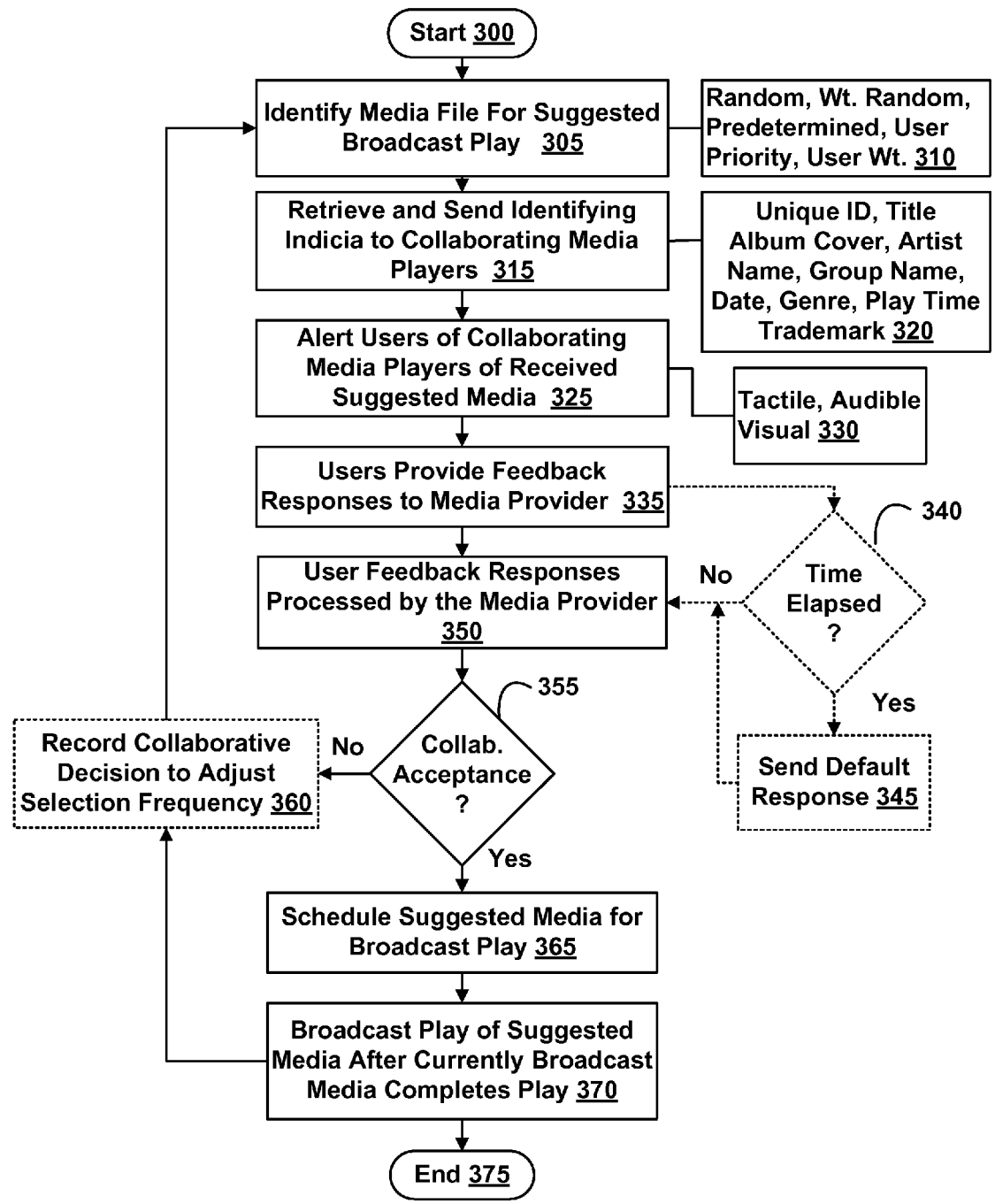
FIG. 3—depicts a process flow chart of an exemplary embodiment of the collaborative media suggestion and selection process.

Referring to FIG. 3, an exemplary flow chart of certain embodiments is depicted. The process is initiated 300 when the media provider begins a media suggestion sequence. The media provider begins by identifying a media file for suggested broadcast play 305. The identification process may be accomplished in variety of ways, including for example, sequential selection, random selection, weighted random selection, elimination selection, predetermined selection based on user preferences, operator input selection, user priority and user weighting 310. The media provider then retrieves and sends identifying indicia associated with the identified media file to the group of collaborating media players 315. The identifying indicia include for example, a unique ID. In some embodiments the identifying indicia may also include descriptive content such as a media title, a graphic representation of an album cover, an artist name, a group name, a date, a genre, a play time, a trademark and any combination thereof 320. In alternate embodiments the descriptive content is stored locally upon the portable media players and is accessed with reference to the received indicia data.

Upon receiving the identifying indicia each media player may optionally alert its associated user that an identified media has been suggested for play 325. The alert may be provided as a tactile sensation (vibration), audible tone and/or in conjunction with a visual display 330. For example, the user may hear an audible alert simultaneously with the title of the suggested media file being displayed graphically upon the media player. In some embodiments an identifying representation of the suggested media file may be announced verbally to the user using speech synthesis components. In general, the alert is composes to obtain the user's attention overly distracting the user from any currently playing media file.

Each alerted user then inputs a feedback response into user interface associated with his or her media player. This may be performed, for example, by manually engaging a user interface element (e.g., button) or by verbally expressing an affirmative or negative response. In a previously mentioned embodiment, a user head-nod may be used to express affirmative or negative feedback with respect to a current media suggestion. The feedback responses are then sent to the media provider for tallying 335. In an optional embodiment, if one or more users fail to provide a feedback response within a predetermined time period 340, a default response is generated and sent to the media provider 345.

Alternately, if one or more media players 200 fail to provide a feedback response to the media provider 100 within a predetermine time period 240, a default response may be generated by the media provider 345 for those media players that did not convey a response. The media provider processes the received feedback responses to determined if collaborative acceptance of the identified media has been obtained 350.

If collaborative acceptance has been obtained 355, the identified media suggested for broadcast play is scheduled 365 and broadcast played after the currently broadcast media completes play 370. At this point, a user may desire to end his or her involvement in the collaborative session 375 by opting out or terminating the collaborative feedback application. Alternately, each user may continue his or her involvement in the collaborative session. In an optional embodiment, the collaborative decision may be recorded in a database associated with the media provider and used to adjust or refine future media identifications 360.

In some embodiments, each user's feedback accuracy is also recorded, the feedback accuracy reflecting if the user's response agreed with the decision of the collaborative group. In some embodiments user feedback accuracy is used in determining a priority level for a given user. The process then repeats 305 and another media file is identified and suggested for broadcast play during play of the collaboratively accepted media.

If collaborative acceptance has not been obtained 355, the identified media suggested for play is rejected. In an optional embodiment, the collaborative decision may be recorded in a database associated with the media provider and used to adjust or refine future media identifications 360. Again, in some embodiments each user's feedback accuracy is also recorded, the feedback accuracy reflecting if the user's response agreed with the decision of the collaborative group. The process then repeats and another media file is identified and suggested for broadcast play as before 305.

As previously described, different member users of a collaborative group may be assigned different priority levels and thereby may have differed weighted influence upon the tally and determination processes. For example, in some embodiments, only users who have a priority level above a certain value are enabled to provide user feedback responses to suggested media items. This may be accomplished by allowing a select group of users to collaboratively accept or reject media selections for the group as a whole. As such, a user's priority level may be determined, at least in part, upon how long the user has been a member of a collaborative group or a patron of a media provider service. In this way, the system may be configured such that only users who have been members of a collaborative group or patrons to a media provider service for more than a certain time period are enabled to provide user feedback responses to a suggested media item. In this way users are rewarded for patronage to a particular media provider service and/or a particular collaborative group.

In another alternate embodiment, only users who have been presented with and/or viewed and/or listened to a certain number of promotional advertisements, are assigned a priority level of sufficient value that enables them to provide user feedback responses to suggested media items. In this way, users may be rewarded for experiencing promotional advertisements by earning increasing priority levels and thereby earning greater influence in the media acceptance and rejection process.

In yet another embodiment, users may earn increasing priority as a result of providing accurate responses to media suggestions. By accurate, it is meant that a user's response, whether it is an acceptance or rejection or subjective rating of a suggested media item, is in general agreement with the collaborative decision reached by the collaborative group. If a user's responses are often in general agreement with the collaborative decision of the group, that user is awarded higher priority. If a user's responses are often in conflict with the collaborative decision of the group, that user is reduced in priority level. In this way, users whose responses tend to represent the collaborative will of the group are provided greater weighted influence in the tally and decision making processes.

In still another embodiment, users earn increasing priority in whole or in part as a result of paying a subscription fee to a media provider service. In this way, paying users may be assigned higher priority than non-paying users and thereby have greater influence upon the collaborative decision making process. In a related variation, users who pay a higher subscription fee may be assigned a higher priority than users who pay a lesser subscription fee. In another related variation, priority may be assigned based upon the duration of paid membership to the service, assigning higher priority to users who have been paid subscribers for a longer duration than other users. In this way users are rewarded for loyalty to a particular paid media broadcast service by being enabled greater influence in the collaborative decisions made with respect to suggested media items.

The various exemplary embodiments described herein are merely illustrative of the principles underlying an inventive concept. It is therefore contemplated that various modifications of the disclosed exemplary embodiments will, without departing from the spirit and scope of the various exemplary inventive embodiments will be apparent to persons of ordinary skill in the art. In particular, it is contemplated that functional implementation of the various exemplary embodiments described herein may be implemented equivalently in hardware, software, firmware, and/or other available functional components or building blocks. No specific limitation is intended to a particular method, system or process sequence. Other variations and exemplary embodiments are possible in light of above teachings, and it is not intended that this Detailed Description limit the scope of invention, but rather by the Claims following herein.

What is claimed:

1. A system for collaborative media selection among a media provider and a collaborative group of media players, each individual media player being in processing communications with the media provider and associated with a user, the system comprising:
   a media provider including;
   a processor;
   a datastore functionally coupled to the processor having retrievably stored therein, a plurality of media files; each of the plurality of media files having retrievably associated therewith, identifying indicia descriptive of its associated media file;

a media suggestion application including instructions executable by the processor to;
identify a suggested media file from the plurality of media files for impending broadcast play to the collaborative group of media players;
retrieve from the datastore, the identifying indicia associated with the suggested media file;
contemporaneously send the identifying indicia associated with the suggested media file to the collaborative group of media players in general concurrence with a broadcast play of a current media file;
receive a plurality of separate user feedback responses associated with the suggested media file, the plurality of separate user feedback responses being received from a plurality of media players included in the collaborative group of media players; and,
determine from the received plurality of separate user feedback responses if collaborative acceptance has been obtained for the suggested media file; and,
if collaborative acceptance has been obtained, broadcast play the suggested media file to the collaborative group of media players such that the suggested media file plays generally following a completion of play of the current media file; or,
if collaborative acceptance has been not been obtained, suggesting a different media file for impending broadcast play.

2. The system according to claim 1 wherein each of the collaborative group of media players comprising;
a microprocessor;
a collaborative feedback application including instructions executable by the microprocessor to;
output an identifying representation of the suggested media file to the user associated with the media player;
determine a separate user feedback response regarding the user's preference for the suggested media file in dependence on the user's interaction with the media player;
send the separate user feedback response to the media provider; and,
play the suggested media file for which collaborative acceptance has been determined.

3. The system according to claim 2 wherein the separate user feedback response is determined based upon the user expressing either an acceptance or a rejection of the suggested media file through an explicit interaction with the media player.

4. The system according to claim 2 wherein the collaborative feedback application further includes instructions executable by the microprocessor to provide a default separate user feedback response if the user fails to express either an acceptance or a rejection of the suggested media file through an explicit interaction with the media player within an allotted period of time.

5. The system according to claim 1 wherein the identifying indicia is one of; a unique identifier, a title, a graphical representation of an album cover, an artist name, a group name, a date, a genre, a playing time, and a trademark.

6. The system according to claim 1 wherein the media provider is a server in which the collaborative group of media players are clients.

7. The system according to claim 1 wherein the identifying indicia is sent to the collaborative group of media players generally simultaneously from the media provider.

8. The system according to claim 1 wherein the broadcast play is accomplished using a streaming media process.

9. The system according to claim 1 wherein identifying the media file for suggestion from the plurality of media files is performed at least in part using a random selection process.

10. The system according to claim 1 wherein identifying the media file for suggestion from the plurality of media files is performed at least in part using a weighted random selection process.

11. The system according to claim 1 wherein identifying the media file for suggestion from the plurality of media files is performed at least in part using retrievably stored user preference data for each user associated with at least a portion of the plurality of media players included in the collaborative group of media players.

12. The system according to claim 1 wherein collaborative acceptance of the suggested media file is determined at least in part upon a majority of the plurality of separate user feedback responses received by the media provider being affirmative.

13. The system according to claim 1 wherein collaborative acceptance of the suggested media file is determined at least in part on exceeding a preestablished threshold number or proportion of affirmative responses being received among the plurality of separate user feedback responses received by the media provider.

14. The system according to claim 1 wherein at least one of the plurality of the separate user feedback responses is given non-equal weighting with respect to the other plurality of separate user feedback responses received by the media provider for determination of the collaborative acceptance.

15. The system according to claim 14 wherein the non-equal weightings are dependent at least in part upon non-equal priority levels assigned to one or more particular users associated with the individual media players.

16. The system according to claim 1 wherein the collaborative feedback application further includes instructions executable by the microprocessor to alert its associated user to receipt of the identifying indicia sent from the media provider.

17. The system according to claim 16 wherein the alert is one of; an audible alert, a visual alert, a tactile alert and any combination thereof.

18. The system according to claim 1 wherein identifying a media file for suggestion is based at least in part upon a human operator's input.

19. The system according to claim 1 wherein the suggested media file is broadcast played to the collaborative group of media players such that broadcast play of the suggested media file begins immediately following the broadcast play of the current media file.

20. A method for collaborative media selection among a media provider and a collaborative group of media players, each individual media player being in processing communications with the media provider and associated with a user, the method comprising a media suggestion application including instructions executable by a media provider processor for;
identifying a suggested media file among a plurality of retrievably stored media files for impending broadcast play to the collaborative group of media players;
retrieving identifying indicia associated with the suggested media file;
contemporaneously sending the identifying indicia associated with the suggested media file to the collaborative group of media players in general concurrence with a broadcast play of a current media file;
receiving a plurality of separate user feedback responses associated with the suggested media file, the plurality of separate user feedback responses being received from a plurality of media players included in the collaborative group of media players; and, determining from the received plurality of separate user feedback responses if collaborative acceptance has been obtained for the suggested media file; and, if collaborative acceptance has been obtained, broadcast playing the suggested media file to the collaborative group of media players such that the suggested media file plays generally following a completion of play of the current media file; or, if collaborative acceptance has been not been obtained, suggesting a different media file for impending broadcast play.

21. The method according to claim 20 further comprising a collaborative feedback application including instructions executable by a media player microprocessor for;

outputting an identifying representation of the suggested media file to the user associated with each individual media player;

determining a separate user feedback response regarding the user's preference for the suggested media file in dependence on the user's interaction with the media player;

sending the separate user feedback response to the media provider; and, playing the suggested media file for which collaborative acceptance has been determined.

22. The method according to claim 21 wherein the separate user feedback response is determined based upon the user expressing either an acceptance or a rejection of the suggested media file through an explicit interaction with the media player.

23. The method according to claim 22 wherein the collaborative feedback application further includes instructions executable by the microprocessor for providing a default separate user feedback response if the user fails to express either an acceptance or a rejection of the suggested media file through an explicit interaction with the media player within an allotted period of time.

24. The method according to claim 20 wherein the collaborative feedback application further includes instructions executable by the microprocessor for alerting the user of a receipt of the identifying indicia sent from the media provider.

25. The method according to claim 20 wherein collaborative acceptance of the suggested media file is determined at least in part on one of; a majority of the plurality of separate user feedback responses being affirmative responses, the affirmative responses exceeding a predetermined proportion of feedback responses, and the affirmative feedback responses cumulatively exceeding a predetermined threshold.

26. The method according to claim 20 wherein collaborative acceptance of the suggested media file is determined at least in part on a weighted tally of the plurality of separate user feedback responses.

27. The method according to claim 20 wherein at least one of the plurality of separate user feedback responses is given non-equal weightings with respect to other of the plurality of separate user feedback responses in the determination of the collaborative acceptance.

28. The method according to claim 27 wherein the non-equal weightings are dependent at least in part upon non-equal priority levels associated with one or more particular users associated with each of the individual media players.

29. A computer program product embodied in a tangible form comprising instructions executable by a media provider processor to;

identify a suggested media file among a plurality of media files for impending broadcast play to a collaborative group of media player processors in processing communications with the media provider processor;

the plurality of media files being retrievably stored in a datastore coupled to media provider processor and each media file having associated therewith, a retrievably stored identifying indicia;

retrieve the identifying indicia associated with the suggested media file;

contemporaneously send the identifying indicia associated with the suggested media file to the collaborative group of media players in general concurrence with a broadcast play of a current media file;

receive a plurality of separate user feedback responses associated with the suggested media file, the plurality of separate user feedback responses being received from a plurality of media players included in the collaborative group of media player processors; and, determine from the received plurality of separate user feedback responses if collaborative acceptance has been obtained for the suggested media file; and, if collaborative acceptance has been obtained, broadcast play the suggested media file to the collaborative group of media players such that it plays after the completion of play of the current media file; or, if collaborative acceptance has been not been obtained, suggest a different media file for impending broadcast play.

30. The computer program product according to claim 29 further comprising instructions embodied in a tangible form executable by each of the collaborative group of individual media player processors to;

output an identifying representation of the suggested media file to a user associated with each individual media player;

determine a separate user feedback response regarding the user's preference for the suggested media file in dependence on the user's interaction with the media player;

send the separate user feedback response to the media provider processor; and, play the suggested media file for which collaborative acceptance has been determined.

31. The computer program product according to claim 29 further comprising instructions embodied in a tangible form executable by the media provider processor to determine collaborative acceptance of the suggested media file based at least in part upon a majority or weighted tally of affirmative responses included in the plurality of separate user feedback responses received by the media provider processor.

32. The computer program product according to claim 29 wherein the tangible form is one of; logical media, optical media and magnetic media.

* * * * *

UNITED STATES PATENT AND TRADEMARK OFFICE
CERTIFICATE OF CORRECTION

PATENT NO. : 7,562,117 B2  Page 1 of 1
APPLICATION NO. : 11/533037
DATED : July 14, 2009
INVENTOR(S) : Rosenberg It is certified that error appears in the above-identified patent and that said Letters Patent is hereby corrected as shown below:

In the CLAIMS:
Claim 1, column 18, line 61, delete "including;" and insert --including:--.
Claim 1, column 18, line 62, after "a processor;" insert --and--.
Claim 1, column 18, line 64, delete "files;" and insert --files,--.
Claim 1, column 19, line 2, delete "to;" and insert --to:--.
Claim 1, column 19, lines 16 and 20, delete "and," and insert --and--.
Claim 2, column 19, line 30, delete "comprising;" and insert --comprises:--.
Claim 2, column 19, line 31, after "a microprocessor;" insert --and--.
Claim 2, column 19, line 33, delete "to;" and insert --to:--.
Claim 2, column 19, line 40, delete "and," and insert --and--.
Claim 5, column 19, line 57, delete "of;" and insert --of:--.
Claim 17, column 20, line 40, delete "of;" and insert --of:--.
Claim 20, column 20, line 56, delete "for;" and insert --for:--.
Claim 20, column 21, lines 3 and 6, delete "and," and insert --and--.
Claim 20, column 21, line 11, delete "or," and insert --or--.
Claim 21, column 21, line 17, delete "for;" and insert --for:--.
Claim 21, column 21, line 26, delete "and," and insert --and--.
Claim 25, column 21, line 48, delete "of;" and insert --of:--.
Claim 29, column 22, line 7, delete "to;" and insert --to:--.
Claim 29, column 22, line 11, delete "processor;" and insert --processor,--.
Claim 29, column 22, lines 26 and 29, delete "and," and insert --and--.
Claim 29, column 22, line 33, delete "or," and insert --or--.
Claim 30, column 22, line 40, delete "to;" and insert --to:--.
Claim 30, column 22, line 48, delete "and," and insert --and--.
Claim 32, column 22, line 59, delete "of;" and insert --of:--.

Signed and Sealed this

Tenth Day of November, 2009

David J. Kappos
*Director of the United States Patent and Trademark Office*